US007721069B2

(12) United States Patent
Ramchandran et al.

(10) Patent No.: US 7,721,069 B2
(45) Date of Patent: May 18, 2010

(54) LOW POWER, HIGH PERFORMANCE, HETEROGENEOUS, SCALABLE PROCESSOR ARCHITECTURE

(75) Inventors: Amit Ramchandran, San Jose, CA (US); John Reid Hauser, Jr., Berkeley, CA (US)

(73) Assignee: 3Plus1 Technology, Inc, San Jose, CA (US)

( * ) Notice: Subject to any disclaimer, the term of this patent is extended or adjusted under 35 U.S.C. 154(b) by 78 days.

(21) Appl. No.: 11/180,068

(22) Filed: Jul. 12, 2005

(65) Prior Publication Data

US 2006/0015703 A1 Jan. 19, 2006

Related U.S. Application Data

(60) Provisional application No. 60/587,691, filed on Jul. 13, 2004, provisional application No. 60/598,417, filed on Aug. 2, 2004.

(51) Int. Cl.
*G06F 15/76* (2006.01)
(52) U.S. Cl. .................. 712/34; 712/36; 712/225; 714/795; 708/492
(58) Field of Classification Search ............ 712/225, 712/34, 36; 714/795, 752; 708/492
See application file for complete search history.

(56) References Cited

U.S. PATENT DOCUMENTS 5,572,713 A * 11/1996 Weber et al. .............. 703/27
5,659,782 A 8/1997 Senter et al.
5,784,602 A * 7/1998 Glass et al. ............... 712/220
5,878,085 A 3/1999 McCallister et al.
5,909,559 A 6/1999 So
5,951,677 A * 9/1999 Wolf et al. ............... 712/228
5,987,561 A 11/1999 Witt et al.
6,166,748 A 12/2000 Hook et al.
6,282,631 B1 * 8/2001 Arbel ....................... 712/35
6,434,690 B1 * 8/2002 Ohsuga et al. ............. 712/35
6,484,284 B2 * 11/2002 Smallcomb ............... 714/786

(Continued)

FOREIGN PATENT DOCUMENTS

EP  1 126 368 A2  8/2001

(Continued)

OTHER PUBLICATIONS

Kuroda et al., A 16-Bit Parallel MAC Architecture for a Multimedia RISC Processor, Oct. 8-10, 1998, 103-112.*

(Continued)

*Primary Examiner*—David J Huisman
*Assistant Examiner*—William B Partridge
(74) *Attorney, Agent, or Firm*—Carlos R. Villamar

(57) ABSTRACT

One embodiment of the present includes a heterogenous, high-performance, scalable processor having at least one W-type sub-processor capable of processing W bits in parallel, W being an integer value, at least one N-type sub-processor capable of processing N bits in parallel, N being an integer value smaller than W by a factor of two. The processor further includes a shared bus coupling the at least one W-type sub-processor and at least one N-type sub-processor and memory shared coupled to the at least one W-type sub-processor and the at least one N-type sub-processor, wherein the W-type sub-processor rearranges memory to accommodate execution of applications allowing for fast operations.

36 Claims, 31 Drawing Sheets

U.S. PATENT DOCUMENTS

| | | | |
|---|---|---|---|
| 6,832,306 B1 * | 12/2004 | Ganapathy et al. | 712/41 |
| 2002/0054519 A1 * | 5/2002 | Murai et al. | 365/200 |
| 2003/0014457 A1 * | 1/2003 | Desai et al. | 708/520 |
| 2003/0106008 A1 * | 6/2003 | Butler et al. | 714/752 |
| 2004/0078411 A1 | 4/2004 | Porten et al. | |
| 2004/0162962 A1 * | 8/2004 | Bhatia | 711/212 |
| 2005/0076194 A1 * | 4/2005 | Kanapathippillai et al. | 712/241 |

FOREIGN PATENT DOCUMENTS

| | | |
|---|---|---|
| EP | 1 126 368 A3 | 8/2001 |

OTHER PUBLICATIONS

Suzuki et al., V830R/AV: Embedded Multimedia Superscalar RISC Processor, 1998, 36-47.*

Dolle et al., A 32-b RISC/DSP Microprocessor with Reduced Complexity, Jul. 1997, 1056-1066.*

Bajwa et al., Power Analysis of a 32-bit RISC Microcontroller Integrated with a 16-bit DSP, Aug. 18-20, 1997, 137-142.*

Baumhof et al., A Novel 32 Bit RISC Architecture Unifying RISC and DSP, 1997, 587-590.*

Balmer et al., A Single Chip Multimedia Video Processor, 1994, 91-94.*

Joe Heinrich, MIPS R400 Microprocessor User's Manual Second Edition, MIPS Technologies, Inc., 1994.

NS Manju Nath, C compilers and development tools: Simplify DSP assembly-language programming, Article, Jan. 21, 1999, 5 pages.

A. Riel and E. Brenner, Parallelizing and Optimizing a Simulator Kernel on a TMS320C40 Multi-DSP Architecture, Serial, Dec. 1995, 26 pages, SPRA309, Texas Instruments, Efrie, France.

Stolberg H-J et al.: "Hibrid-SoC: a multi-core system-on-chip architecture for multimedia signal processing applications" Design, Automation and Test in Europe Conference and Exhibition, 2003 Munich, Germany Mar. 3-7, 2003, Los Alamitos, CA USA IEEE Comput. Soc, US, Mar. 3, 2003, pp. 8-13suppl.; XP010673491, ISBN: 0-7695-1870-2, p. 2, left hand column, line 30-p. 4, left hand column line 25, figures 1-3.

Hoogenboom: "Tasking helps Siemens with 32-bit Tricore architecture design" Internet Citation, [Online] Nov. 1997, XP002259125, Retrieved from the Internet: URL:http://www.tasking.com/technology/tricore-archttecture.pdf> [retrieved on Oct. 24, 2003] p. 4, line 10-line 20.

Mani Bhadra Vaya: "Viturbo: A Reconfigurable Architecture for Ubiquitous Wireless Networks" Thesis: Master of Science. Electrical and Computer Engineering Rice University Houston, Aug. 2002, page complete XP002314960, figure 4.1, figure 4.2, p. 25-p. 34.

* cited by examiner

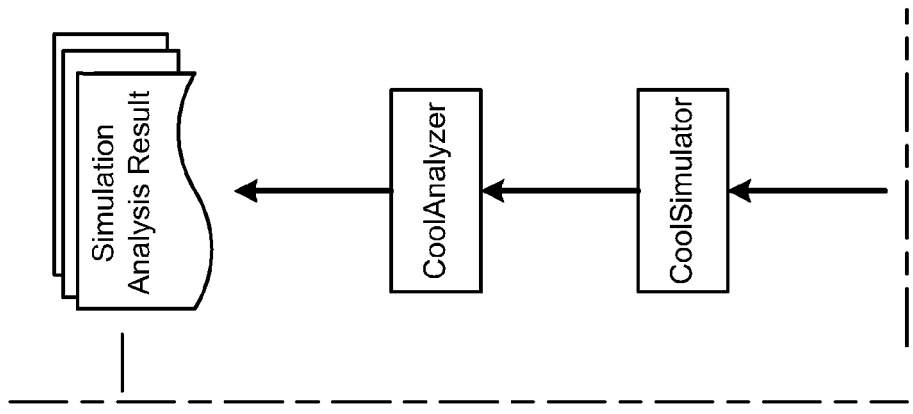
FIG. 21iii

LOW POWER, HIGH PERFORMANCE, HETEROGENEOUS, SCALABLE PROCESSOR ARCHITECTURE

CROSS REFERENCE TO RELATED APPLICATION

This application claims the benefit of U.S. Provisional Patent Application No. 60/587,691, entitled "Quasi-Adiabatic Programmable or COOL Processors Architecture" and filed on Jul. 13, 2004 and the benefit or U.S. Provisional Patent Application No. 60/598,417, entitled "Quasi-Adiabatic Programmable Processor Architecture" and filed on Aug. 2, 2004.

BACKGROUND OF THE INVENTION

1. Field of the Invention

This invention relates generally to the field of processors and more particularly, to processors having low power consumption, high performance, low die area, and flexibly and scalably employed in multimedia and communications applications.

2. Description of the Prior Art

With the advent of the popularity of consumer gadgets, such as cell or mobile phones, digital cameras, iPODS® and personal data assistances (PDAs), many new standards for communication with these gadgets have been adopted by the industry at wide. Some of these standards include H264, Moving Picture Experts Group (MPEG4), Ultra Wide Band (UWB), BLUETOOTH®, 2 G/2.5 G/3 G/4 G, Global Positioning System (GPS), MP3 and Security. iPODS® is a registered trademark owned by Apple Computers, Inc. BLUETOOTH® is a registered certification mark owned by Bluetooth Sig, Inc. However, an emerging problem is the use of different standards dictating communications of and between different gadgets requiring tremendous development effort. One of the reasons for the foregoing problem is that no processor or sub-processor, currently available in the marketplace, is easily programmable for use by all digital devices and conforming to the various mandated standards. It is only a matter of time before this problem grows as new trends in consumer electronics warrant even more standards adopted by the industry in the future.

One of the emerging and, if not, current, requirements of processors is low power consumption yet the ability to cause execution of code sufficient to process multiple applications. Current power consumption is on the order of sub-hundreds of milliwatts per application, whereas, the goal is to be under sub-hundreds of milliwatts for executing multiple applications. Another requirement of processors is low cost. Due to the wide utilization of processors in consumer products, the processor must be inexpensive to manufacture, otherwise, its use in most common consumer electronics is not pragmatic.

To provide specific examples for current processor problems, problems associated with RISCs, which are used in some consumer products, microprocessors, which are used in other consumer products, digital signal processors (DSPs), which are used in yet other consumer products and application specific integrated circuits (ASICs), which are used in still other consumer products, and some of the other well-know processors, each exhibiting a unique problem are briefly described below. These problems along with advantages of using each are outlined below in a "Cons" section discussing the disadvantages thereof and a "Pros" section discussing the benefits thereof.

A. RISC/Super Scalar Processors

RISC and Super Scalar processors have been the most widely accepted architectural solution for all general purpose computing. They are often enhanced with application specific accelerators for solving certain specialized problems within the context of a general solution.

Examples include: ARM series, ARC series, StrongARM series, and MIPS series.

Pros:

Industry wide acceptance has lead to a more matured tool chain and wide software choices A robust programming model has resulted from a very efficient automatic code generator used to generate binaries from high level languages like C.

Processors in the category are very good general purpose solutions.

Moore's Law can be effectively used for increasing performance.

Cons:

The general purpose nature of the architecture does not leverage common/specific characteristics of a set or subset of applications for better price, power and performance.

They consume moderate to high amounts of power with respect to the amount of computation provided.

Performance increase is mostly achieved at the expense of pipeline latency which adversely affects several multimedia and communication algorithms.

Complicated hardware scheduler, sophisticated control mechanisms and significantly reduced restrictions for more efficient automatic code generation for general algorithms have made this category of solutions less area efficient.

B. Very Long Instruction Word (VLIW) and DSPs

VLIW architectures eliminated some of the inefficiencies found in RISC and Super Scalar architectures to create a fairly general solution in the digital signal processing space. Parallelism was significantly increased. The onus of scheduling was transferred from hardware to software to save area.

Examples include: TI 64xx, TI 55xx, StarCore SC140, ADI SHARC series.

Pros:

Restricting the solution to the signal processing space improved 3P in comparison with RISC and Super Scalar architectures VLIW architectures provide higher level of parallelism relative to RISC and superscalar architectures.

An efficient tool chain and industry wide acceptance was generated fairly rapidly.

Automatic code generation and programmability are showing significant improvements as more processors designed for signal processing fall into this category.

Cons:

Although problem solving capability is reduced to the digital signal processing space, it is too broad for a general solution like VLIW machine to have efficient 3P.

Control is both expensive and power consuming especially for primitive control code in many multimedia and communication applications.

Several power and area inefficient techniques were used to make automatic code generation easy. Strong reliance on these techniques by the software community is carrying forward this inefficiency from generation to generation.

VLIW architectures are not well suited for processing serial code.

C. Reconfigurable Computing

Several efforts in industry and academia over the last 10 years were focused towards making a flexible solution with ASIC like price, power and performance characteristics. Many have challenged existing and matured laws and design paradigms with little industry success. Most of the attempts have been in the direction of creating solutions based on coarser grain FPGA like architectures.

Pros:
Some designs restricted to a specific application while providing needed flexibility within that application proved to be price, power, performance competitive
Research showed that such restricted yet flexible solutions can be created to address many application hotspots.

Cons:
Several designs in this space did not provide an efficient and easy programming solution and therefore was not widely accepted by a community adept in programming DSPs.
Automatic code generation from higher level languages like C was either virtually impossible or highly inefficient for many of the designs.
3P advantage was lost when an attempt was made to combine heterogeneous applications using one type of interconnect and one level of granularity. Degree of utilization of the provided parallelism suffered heavily.
Reconfiguration overhead was significant in 3P for most designs.
In many cases, the external interface was complicated because the proprietary reconfigurable fabric did not match industry standard system design methodologies.
Reconfigurable machines are uni-processors and rely heavily on a tightly integrated RISC even for processing primitive control.

D. Array of Processors

Some recent approaches are focused on making reconfigurable systems better suited to process heterogeneous applications. Solutions in this direction connect multiple processors optimized for either one or a set of applications to create a processor array fabric.

Pros:
Different processors optimized for different sets of applications when connected together using an efficient fabric can help solve a wide range of problems.
Uniform scaling model allows number processors to be connected together as performance requirements increase.
Complex algorithms can be efficiently partitioned.

Cons:
Although performance requirements may be adequately answered, power and price inefficiencies are too high.
The programming model varies from processor to processor. This makes the job of the application developer much harder.
Uniform scaling of multiple processors is a very expensive and power consuming resource. This has shown to display some non-determinism that may be detrimental to the performance of the entire system.
The programming model at the system level suffers from complexity of communicating data, code and control information without any shared memory resources— since shared memory is not uniformly scalable.
Extensive and repetitive glue logic required to connect different types of processors to a homogeneous network adds to the area inefficiencies, increases power and adds to the latency.

In light of the foregoing, there is a need for a low-power, inexpensive, efficient, high-performance, flexibly programmable, heterogenous processor for allowing execution of one or more multimedia applications simultaneously.

SUMMARY OF THE INVENTION

Briefly, one embodiment of the present includes a heterogenous, high-performance, scalable processor having at least one W-type sub-processor capable of processing W bits or greater in parallel, W being an integer value, at least one N-type sub-processor capable of processing N bits in parallel, N being an integer value smaller than W. The processor further includes a shared bus coupling the at least one W-type sub-processor and at least one N-type sub-processor and memory shared coupled to the at least one W-type sub-processor and the at least one N-type sub-processor, wherein the W-type sub-processor rearranges data bytes in transit to or from memory to accommodate execution of applications allowing for fast operations.

IN THE DRAWINGS

FIG. 1 shows an application 10 is shown with reference to a digital product 12 including an embodiment of the present invention FIG. 2 shows an exemplary integrated circuit 20 including a heterogenous, high-performance, scalable processor 22 coupled to a memory controller and direct memory access (DMA) circuit 24 in accordance with an embodiment of the present invention.

DETAILED DESCRIPTION OF THE PREFERRED EMBODIMENT

Figure 1:
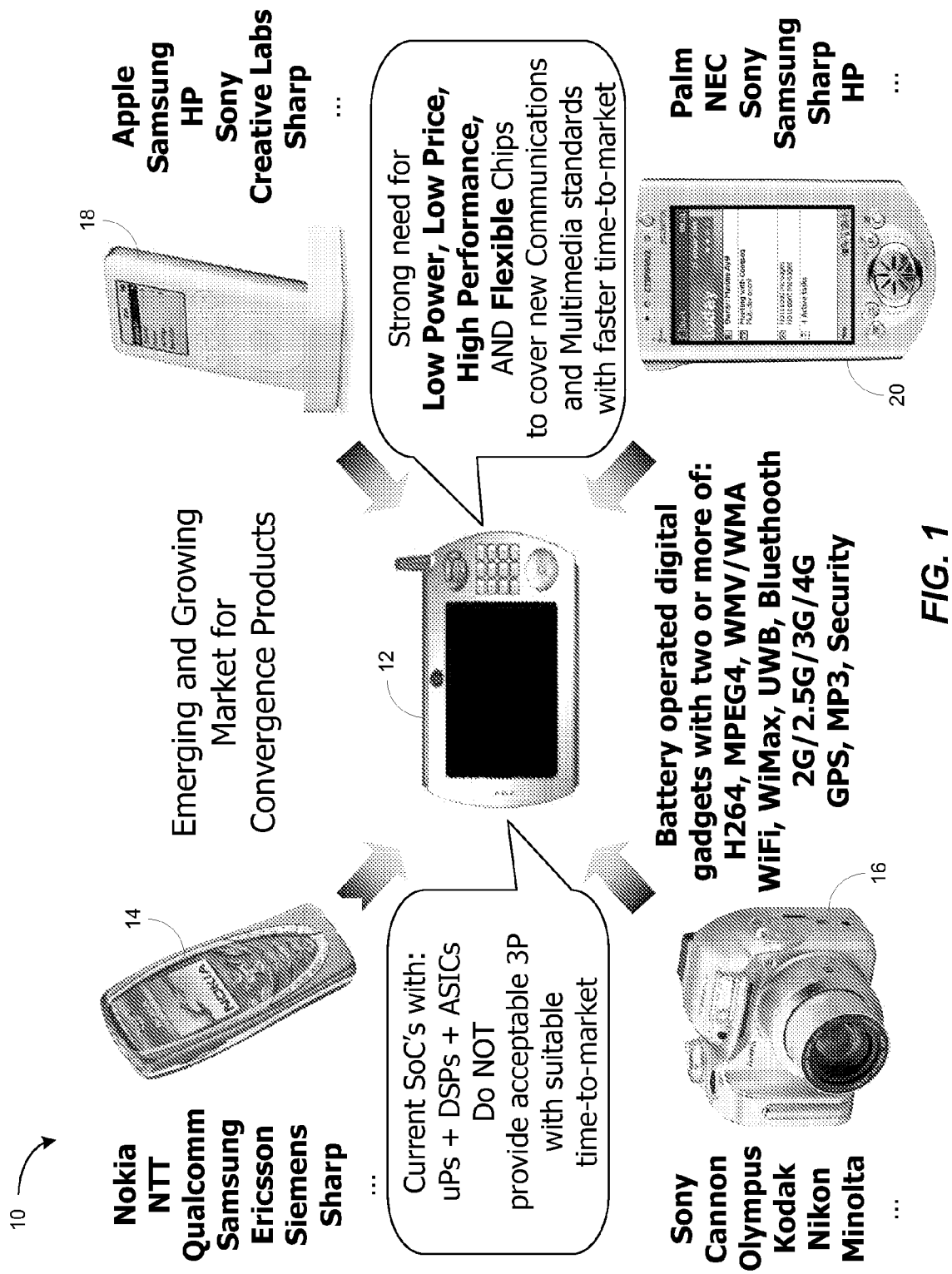

Referring now to FIG. 1, an application 10 is shown with reference to a digital product 12 including an embodiment of the present invention. FIG. 1 is intended to provide the reader with a perspective regarding some, but not necessarily all, of the advantages of a product, which includes an embodiment of the present invention relative to those available in the marketplace.

Accordingly, the product 12 is a converging product in that it incorporates all of the applications that need to be executed by today's mobile phone device 14, digital camera device 16, digital recording or music device 18 and PDA device 20. The product 12 is capable of executing one or more of the functions of the devices 14-20 simultaneously yet utilizing less power.

The product 12 is typically battery-operated and therefore consumes little power even when executing multiple applications of the applications executed by the devices 14-20. It is also capable of executing code to effectuate operations in conformance with a multitude of applications including but not limited to: H264, MPEG4, UWB, Bluetooth, 2 G/2.5 G/3 G/4 G, GPS, MP3 and Security.

Figure 2I:
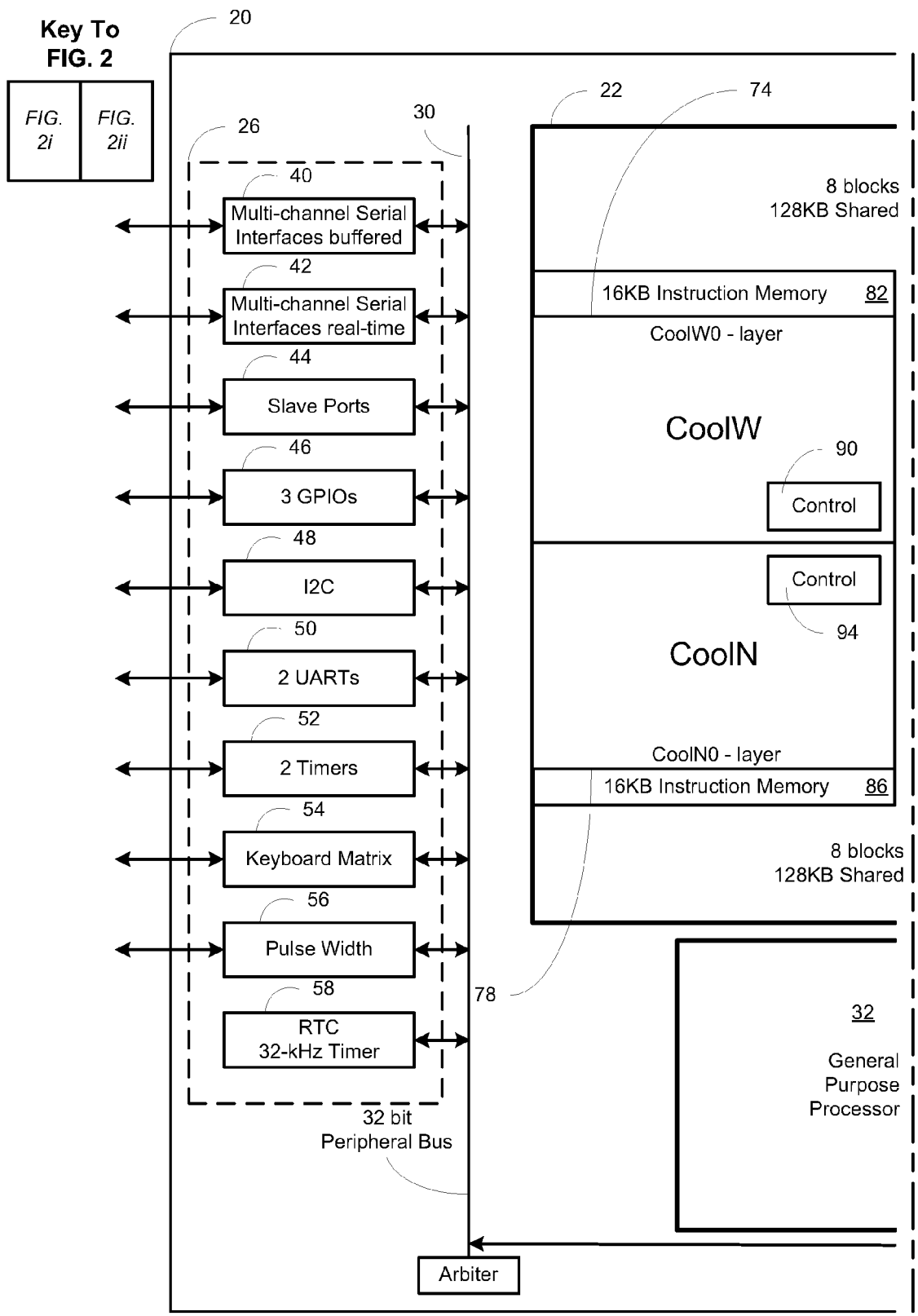
Figure 2I:
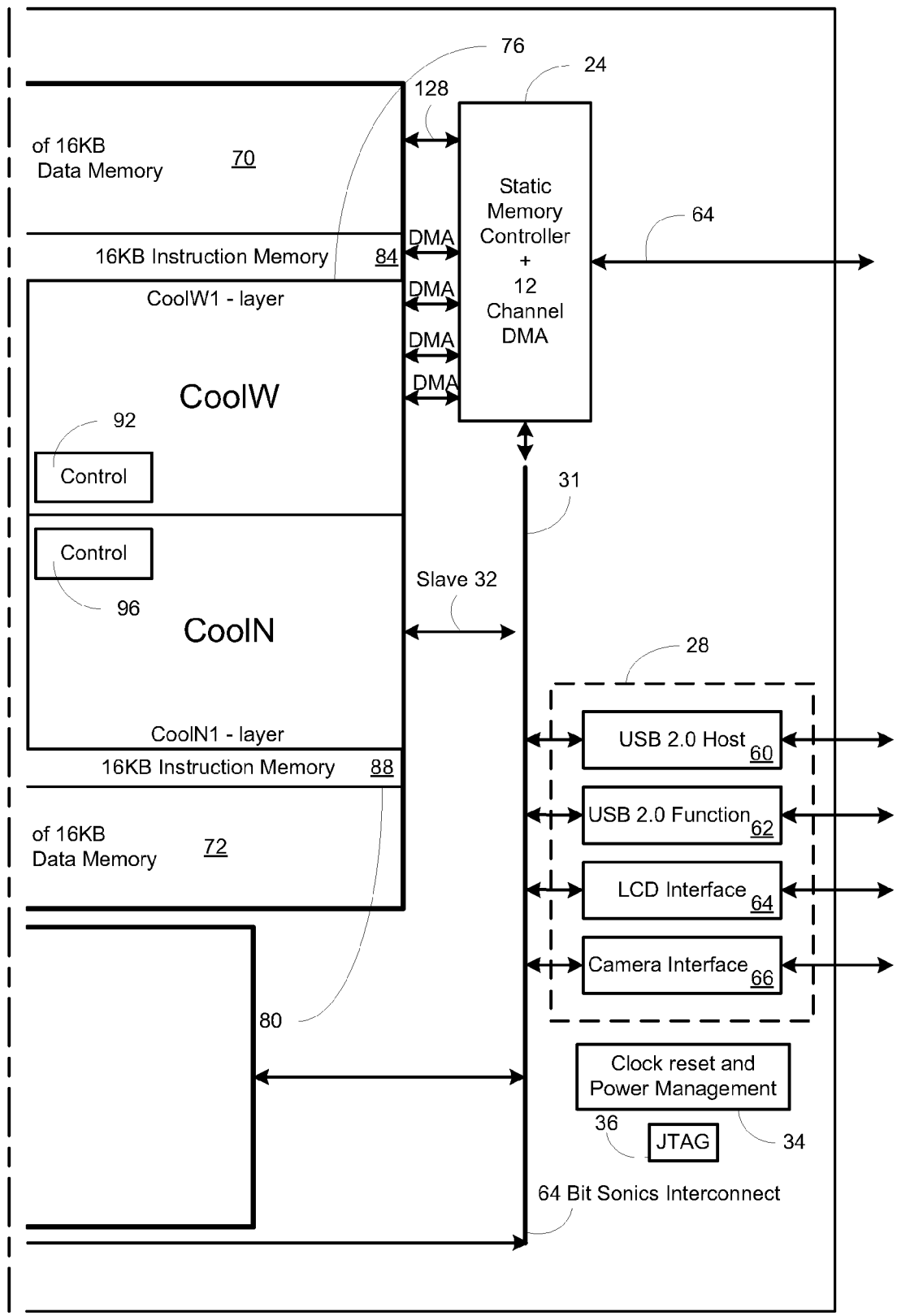

FIG. 2 shows an exemplary integrated circuit 20 including a heterogenous, high-performance, scalable processor 22 coupled to a memory controller and direct memory access (DMA) circuit 24 in accordance with an embodiment of the present invention. Further shown in FIG. 2, the processor 22 is coupled to interface circuit 26 through a general purpose bus 30 and to the interface circuit 28 through a general purpose bus 31 and further coupled, through the bus 30, to a general purpose processor 32 through the bus 31. The circuit 20 is further shown to include a clock reset and power management 34 for generating a clock utilized by the remaining circuits of the circuit 10, a reset signal utilized in the same manner and circuitry for managing power by the same. There is further included in the circuit 20, a Joint Test Action Group (JTAG) circuit 36. JTAG is used as a standard for testing chips.

The interface circuit 26 shown coupled to the bus 30 and interface circuit 28, shown coupled to the bus 31, include the blocks 40-66, which are generally known to those of ordinary skill in the art and used by current processors.

The processor 22, which is a heterogeneous multi-processor, is shown to include shared data memory 70, shared data memory 72, a CoolW sub-processor (or block) 74, a CoolW sub-processor (or block) 76, a CoolN sub-processor (or block) 78 and a CoolN sub-processor (or block) 80. Each of the blocks 74-80 has associated therewith an instruction memory, for example, the CoolW block 74 has associated therewith an instruction memory 82, the CoolW block 76 has associated therewith an instruction memory 84, CoolN block 78 has associated therewith an instruction memory 86 and the CoolN block 80 has associated therewith an instruction memory 88. Similarly, each of the blocks 74-80 has associated therewith a control block. The block 74 has associated therewith a control block 90, the block 76 has associated therewith a control block 92, the block 78 has associated therewith a control block 94 and the block 80 has associated therewith a control circuit 96. The block 74 and 76 are designed to generally operate efficiently for 16, 24, 32 and 64-bit operations or applications, whereas, the blocks 78 and 80 are designed to generally operate efficiently for 1, 4, or 8-bit operations or applications.

The blocks 74-80 are essentially sub-processors and the CoolW blocks 74 and 76 are wide (or W) type of blocks, whereas, the CoolN blocks 78 and 80 are narrow (or N) type of blocks. Wide and narrow refers to the relative number of parallel bits processed or routed within a sub-processor and that gives the heterogeneous characteristic of the processor 22. Furthermore, the circuit 24 is coupled directly to one of the sub-processors, i.e. one of the blocks 74-80 resulting in the lowest latency path through the sub-processor to which it is coupled. In FIG. 2, the circuit 24 is shown directly coupled to the block 76 although it may be coupled to any of the blocks 74, 78 or 80. Higher priority agents or tasks may be assigned to the block which is directly coupled to the circuit 24.

It should be noted that while four blocks 74-80 are shown, other number of blocks may be utilized, however, utilizing additional blocks clearly results in additional die space and higher manufacturing costs.

Complicated applications requiring great processing power are not scattered in the circuit 20, rather, they are grouped or confined to a particular sub-processor or block for processing, which substantially improves power consumption by eliminating or at least reducing wire (metal) or routing lengths thereby reducing wire capacitance. Additionally, utilization is increased and activity is reduced contributing to lower power consumption.

The circuit 20 is an example of silicon on chip (or SoC) offering Quasi-Adiabatic Programmable sub-Processors for multimedia and communications applications, two types of sub-processors are included, as previously indicated: W type and N type. W type or Wide type processor is designed for high Power, Price, Performance efficiency in applications requiring 16, 24, 32 and 64-bits of processing. N type or Narrow type processor is designed for high efficiency in applications requiring 8, 4 and 1-bit of processing. While these bit numbers are used in the embodiments of the present invention, by way of figures and description, other number of bits may be readily employed.

Different applications require different performance or processing capabilities and are thus, executed by a different type of block or sub-processor. Take for instance, applications that are typically executed by DSPs, they would be generally be processed by W type sub-processors, such as the blocks 74 or 76 of FIG. 2 because they characteristically include commonly occurring DSP kernels. Such applications include, but are not limited to, fast fourier transform (FFT) or inverse FFT (IFFT), Adaptive finite impulse response (FIR) filters, Discrete Cosine transform (DCT) or inverse DCT (IDCT), Real/ Complex FIR filter, IIR filter, resistance capacitor Root Raise Cosine (RRC) filter, Color Space Converter, 3D Bilinear Texture Mapping, Gouraud Shading, Golay Correlation, Bilinear Interpolation, Median/Row/Column Filter, Alpha Blending, Higher-Order Surface Tessellation, Vertex Shade (Trans/Light), Triangle Setup, Full-Screen Anti-aliasing and Quantization.

Other commonly occurring DSP kernels can be executed by N type sub-processors, such as blocks 78 and 80 and include, but are not limited to, Variable Length Codec, Viterbi Codec, Turbo Codec, Cyclic Redundancy Check, Walsh Code Generator, Interleaver/De-Interleaver, LFSR, Scrambler, Despreader, Convolution Encoder, Reed-Solomon Codec, Scrambling Code Generator, and Puncturing/De-puncturing.

Both W and N type sub-processors are capable of keeping net activity and the resulting energy per transition low while maintaining high performance with increased utilization in comparison with existing architectural approaches like RISC, Reconfigurable, Superscalar, VLIW and Multi-processor approaches. The sub-processor architecture of the processor 22 reduces die size resulting in an optimal processing solution and includes a novel architecture referred to as "Quasi-Adiabatic" or "COOL" architecture. Programmable processors in accordance therewith are referred to as Quasi-Adiabatic Programmable or COOL Processors.

Quasi-Adiabatic Programmable or COOL Processors optimize data path, control, memory and functional unit granularity to match a finite subset of applications, as described previously. The way in which this is accomplished will be clear relative to a discussion and presentation of figures relating to the different units or blocks or circuits and their interoperations of the processor 22, as presented below.

"Quasi-Adiabatic Programmable" or Concurrent Applications of heterOgeneous intercOnnect and functionaL units (COOL) Processors. In term of thermodynamics, Adiabatic Processes do not waste heat and transfer all the used energy to performing useful work. Due to the non-adiabatic nature of existing standard processes, circuit design, and logic cell library design techniques, one can not ever make an Adiabatic Processors. However, among the possible different possible processor architecture some may be closer to Adiabatic. The various embodiments of the present invention show a class of processor architectures which are significantly closer to Adiabatic as compared to the architectures of prior art, while they are, nevertheless, programmable. They are referred to as "Quasi-Adiabatic Programmable Processors".

The integrated circuit 20 allows as many applications as can be supported by the resources within the processor 22 to be executed together or concurrently and the number of such applications far exceeds that which is supported by current processors. Examples of applications that can be simultaneously or concurrently executed by the integrated circuit 20 include but are not limited to downloading an application from a wireless device while decoding a movie that has been received, thus, a movie can be downloaded and decoded simultaneously. Due to achieving simultaneous application execution on the integrated circuit 20, which has a small die size or silicon real estate as compared to the number of applications it supports, costs of manufacturing the integrated circuit are significantly lower than that which is required for multiple devices of FIG. 1. Additionally, the processor 22 offers a single programmable framework to a user to implement multiple functions, such as multimedia complex applications. Of important value is the ability of the integrated circuit 20 and namely, the processor 22, to support future standards adopted by the industry, which are expected to be of greater complexity than that of today's standards.

Each of the blocks 74-80 can execute only one sequence (or stream) of programs at a given time. A sequence of program is referred to a function associated with a particular application. For example, FFT is a type of sequence. However, different sequences may be dependent on one another. For example, an FFT program, once completed may store its results in the memory 70 and the next sequence, may then use the stored result. Different sequences sharing information in this manner or being dependent upon each other in this manner is referred to as "stream flow".

In FIG. 2, the memories 70 and 72 each include 8 blocks of 16 kilobytes of memory, however, in other embodiments, different size memory may be utilized.

The instruction memories 82, 84, 86 and 88 are used to store instructions for execution by the blocks 74-80, respectively.

Figure 3:
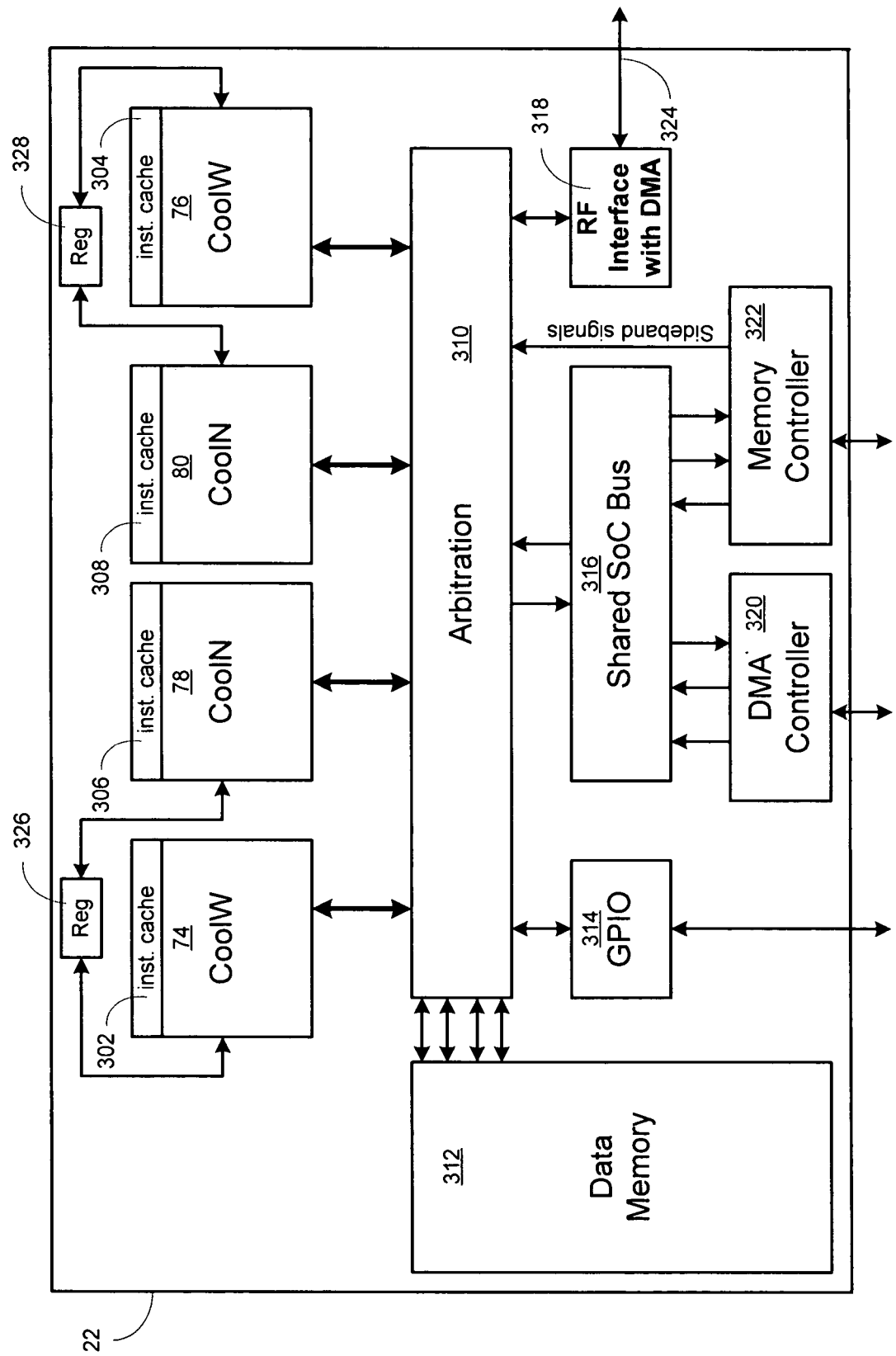
FIG. 3 illustrates further details of the processor 20 in accordance with an embodiment of the present invention.

FIG. 3 shows further details of the processor 20 in accordance with an embodiment of the present invention. In FIG. 3, the processor 20 is shown to include the sub-processors 74-80, each including an instruction cache 302-308, respectively, for storing instructions processed by the respective sub-processor. The processor 20 is further shown to include an arbitration block 310, a data memory 312, a general purpose input/output (GPIO) block 314, a shared SoC bus block 316, a radio frequency (RF) interface with DMA block 318, a DMA controller block 320 and a memory controller block 322 coupled in the manner shown in FIG. 3. The data memory 312 serves as storage of data information, which is utilized by the sub-processors and other blocks under the direction of the arbitration block 310, which directs operation and data traffic of the various structures/blocks shown in FIG. 3. The block 314 regulates input and output traffic to and from the processor 22, the block 320 controls DMA operations performed by the processor 22, through the bus 316, the block 322 controls operations relating to the memory 312, through the bus 316, the block 318 includes circuitry to handle DMA operations and is able to receive and/transmit RF signals coupled through the signal(s) 324.

Optionally, shared registers 326 and 328 cause communication directly between two types of sub-processors. For example, in FIG. 3, the register 326 is shown coupled to the blocks 74 and 78 for causing storage of information that is to be shared by these blocks, which facilitates execution of applications utilizing more than one sub-processor to the tune of expediting the execution thereof. Similarly, the register 328 is shown coupled to the blocks 80 and 76 for the same function as that of the register 326.

Figure 4:
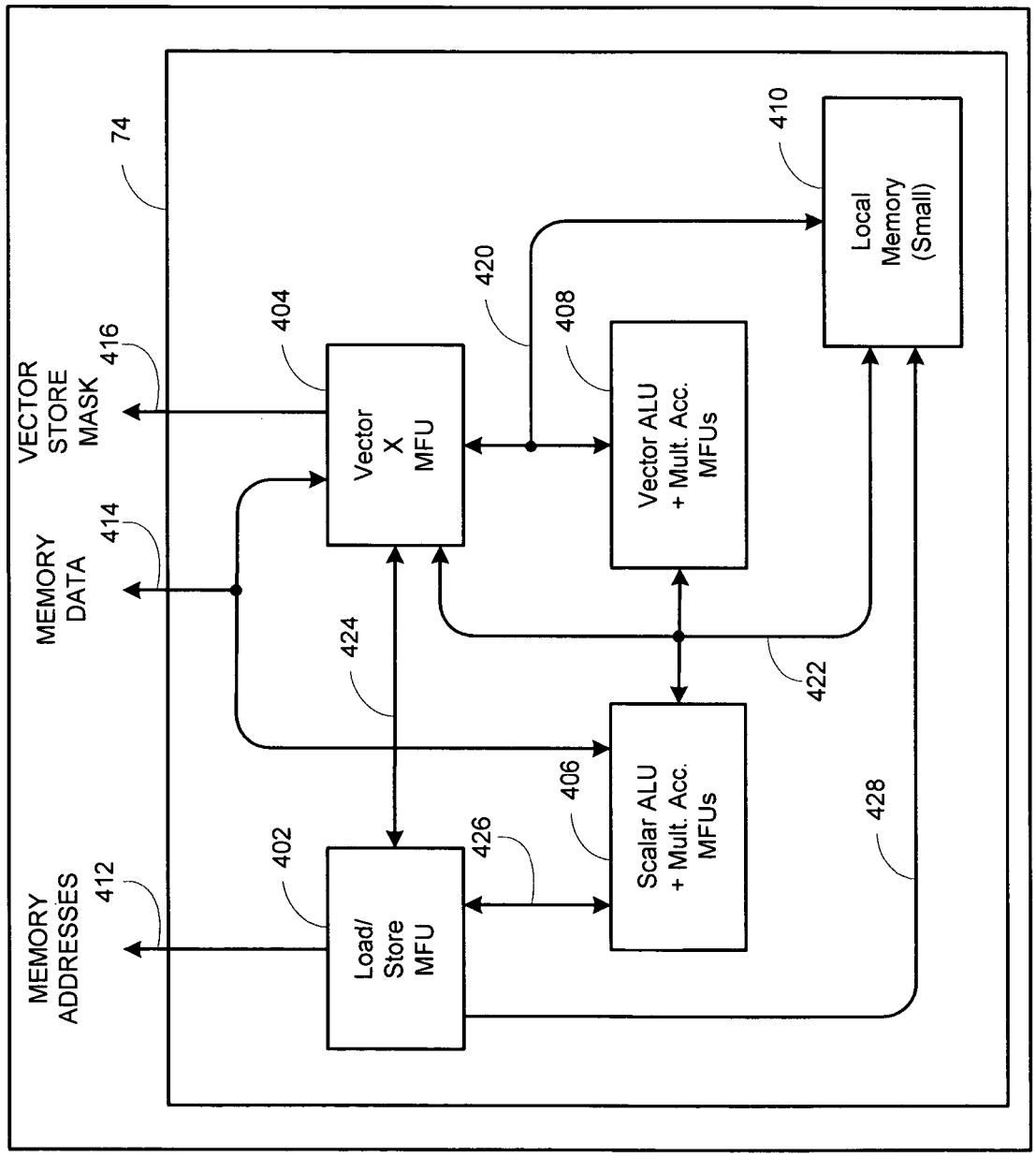
FIG. 4 shows a high level block diagram of the blocks or structure included within one of the W type blocks, such as the block 74 or 76, in accordance with embodiment of the present invention.

FIG. 4 shows a high level block diagram of the blocks or structure included within one of the W type blocks, such as the block 74 or 76, in accordance with an embodiment of the present invention. As an example the block 74 is used in FIG. 4. In FIG. 4 and throughout this document, functional units or macro-blocks with very specific interconnect structure are presented between components like adders, multipliers, registers and multiplexers. These macro-blocks are referred to as "Macro Functional Units" or "MFU". MFUs represent an efficient programmable subset of one or more commonly occurring operations in a finite set of multimedia and communications applications. The high efficiency in the macro-functional units is the result of substituting critical groups of atomic operations found in target applications with a set of derived operations exhibiting far superior performance and power performance. In some cases, commonly occurring operations have been combined in a unique manner to efficiently re-use hardware.

In FIG. 4, the block 74 is shown to include a load/store MFU block 402, a scalar arithmetic logic unit (ALU) and multiply-accumulate (ACC) MFUs block 406, a vector x MFU block 404, a vector ALU and multiply ACC MFU block 408 and a local memory 410 coupled together in the manner shown in FIG. 4. The block 402 generates memory addresses and couples the same on the memory addresses bus 412. Memory data is coupled onto the memory data bus 414 and is bi-directionally coupled to the blocks 404 and 406. Vector store mask is coupled onto the vector store mask bus 416 and generated by the block 404. Further details of each block is presented and discussed relative to subsequent figures. Prior to such a presentation and discussion, some of the general features and blocks of the block 74 are discussed as follows.

The blocks 406 and 408 perform the majority of actual computation on data. The Load/Store MFU block 402 computes addresses for accesses made to/from the memory 312 and the memory 410. The Vector X MFU block 404 rearranges vector data on its way between the memory 312 and the block 408. The Vector X MFU block 404 is also used to generate vector store masks for vector stores to the memory 312. The block 406 only operates on one piece of data at a given time, whereas, the blocks 404 and 408 operate on data in the form of vector. The block 402 provides addresses for memory accesses. Some computation is performed by the block 402 but it is in the nature of overhead computations.

A machine instruction encodes (as needed) separate operations for the various MFU blocks in addition to operations to move data between MFU blocks. All operations in a single instruction are executed in parallel. The Vector X MFU block 404 causes rearranging of vector data and generation of vector store masks under the control of separately encoded operations in instructions. The local memory 410 is used for storing information locally to avoid having to access information externally to the block 74 for every instruction. The bus 412 is coupled to the memory 312 through which memory addresses are provided.

The block 402 is shown coupled to the block 44 through a bus 424, the block 402 is further shown coupled to the block 406 through a bus 426, the block 402 is further shown coupled to the block 410 through the bus 428. The blocks 404, 408 and 410 are shown coupled to each other through a vector bus 420 and the blocks 406, 404, 408 and 410 are shown coupled to each other through a scalar bus 422. A bus is generally a group of wires, each wire coupling a signal wherein the wires are parallel to each other and thus, capable of coupling signals in parallel. The number of wires within a bus defines the number of binary bits, which serves as a characteristic of the bus. In FIG. 4, the vector bus 420 is wider than the scalar bus 422, i.e. the bus 420 includes more bits or wires that can couple more signals, in parallel, compared to the bus 422. An example of the ratio of the number of bits of the bus 420 to the bus 422 is a factor of 4, for example, in the example where the bus 422 is 32 bits, the bus 420 is 4 times 32 bits or 128 bits.

The block 404 also provides vector store mask, which is coupled onto the bus 416.

Memory data is coupled onto the block 406 for computation operations, from the block 402, but vector data is first provided to the block 404 . . . .It is significant to note that the block 404 offers the ability to organize data in memory to match that which is needed in the computation unit, i.e. the block 408, thereby greatly increasing performance.

Figure 5:
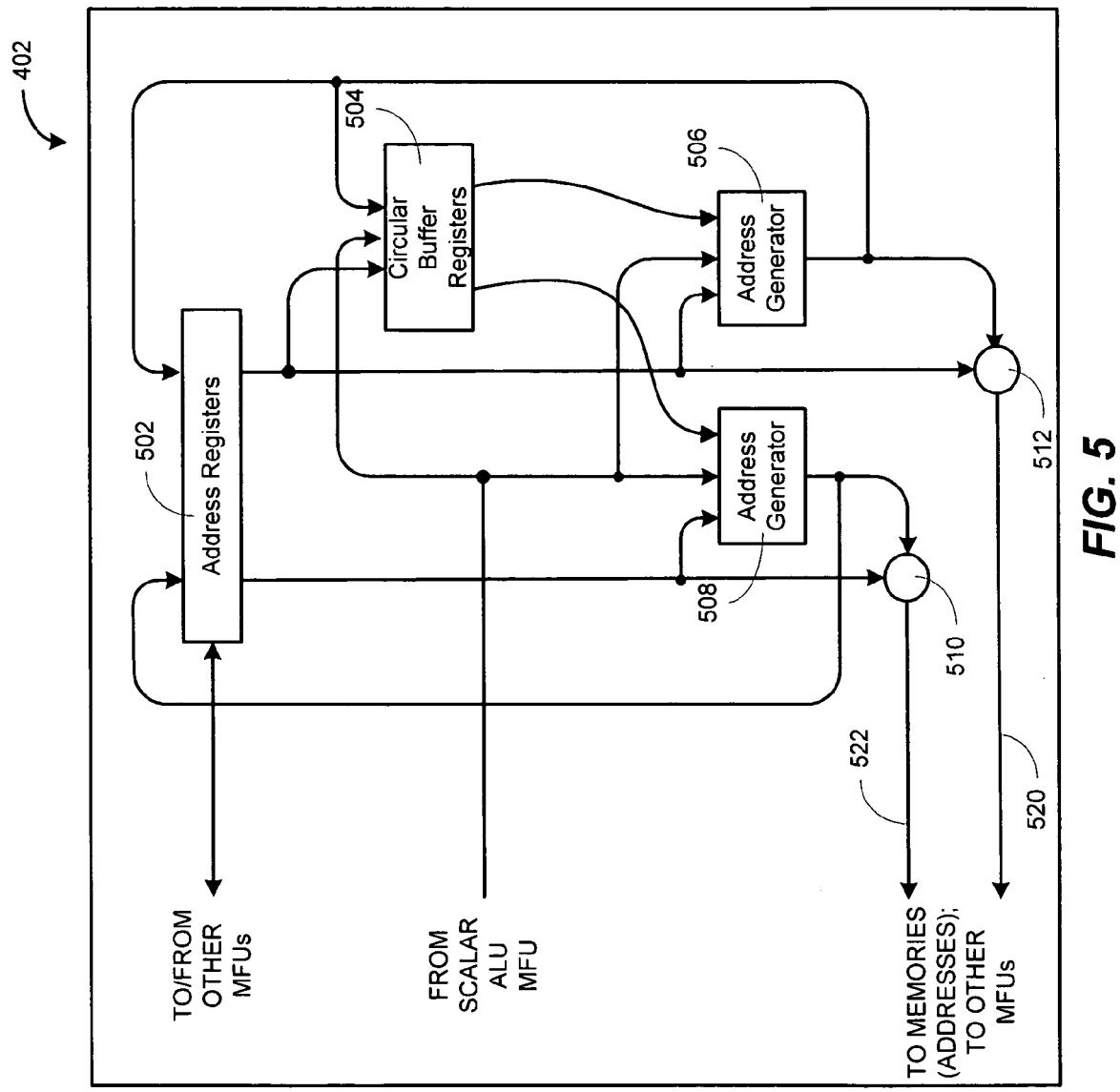
FIG. 5 shows a block diagram of the circuit blocks included in the block 402, in accordance with an embodiment of the present invention.

FIG. 5 shows a block diagram of the circuit blocks included in the block 402, in accordance with an embodiment of the present invention. The block 402 is shown to include an address block 502, a circular buffer register block 504, an address generator block 508, an address generator block 506, a multiplexer (mux) 510 and a mux 512 coupled together in the manner shown in FIG. 5.

The block 502 is coupled to other blocks of the block 402, as shown in FIG. 4 and stores addresses. The block 504 serves to store a circular buffer range in one of the circular buffer registers (block 504). The blocks 506 and 508 cause an address computation to wrap around within a circular buffer range when requested by the program. The arrows leading into the block 504 allow those registers to be loaded. Namely, the block 506 serves to modify the addresses generated by the block 504 or address received from the block 406 or even the addresses generated from the block 502, while the block 508 serves to modify addresses received from the block 502 and/or the block 406 and even the block 504.

The address registers of the block 402 and circular buffer registers of the block 404 provide inputs to the address generators of the blocks 506 and 508. In the case of the address registers of the block 402, those inputs are previously stored addresses, while for the circular buffer registers of the block 404, those inputs are information about circular buffers.

The blocks 506 and 508 serve to modify addresses. Namely, the block 506 serves to modify the addresses generated by the block 504 or address received from the block 406 or even the addresses generated from the block 502, while the block 508 serves to modify addresses received from the block 502 and/or the block 406 and even the block 504. The output of the block 506 is then provided as input to the mux 512, which also receives, as input, the addresses generated by the block 502. The mux 512 then selects one of its inputs and couples the same onto the bus 520 for reception by other blocks of the block 74, as shown in FIG. 4. Similarly, the output of the block 508 provided as input to the mux 510, which also receives, as input, the addresses generated by the block 502. The mux 510 then selects one of its inputs and couples the same onto the bus 522 for reception by memories of the block 74, as shown in FIG. 4.

Thus, the Load/Store MFU can generate two addresses in parallel. An address is computed by combining an address register and either a constant or a value from the Scalar ALU MFU. A computed address can optionally be wrapped around within the bounds of a circular buffer. Computed addresses are primarily intended for use in accessing memories, but may also be assigned to address registers or circular buffer registers, or used as inputs to other MFUs.

Figure 6:
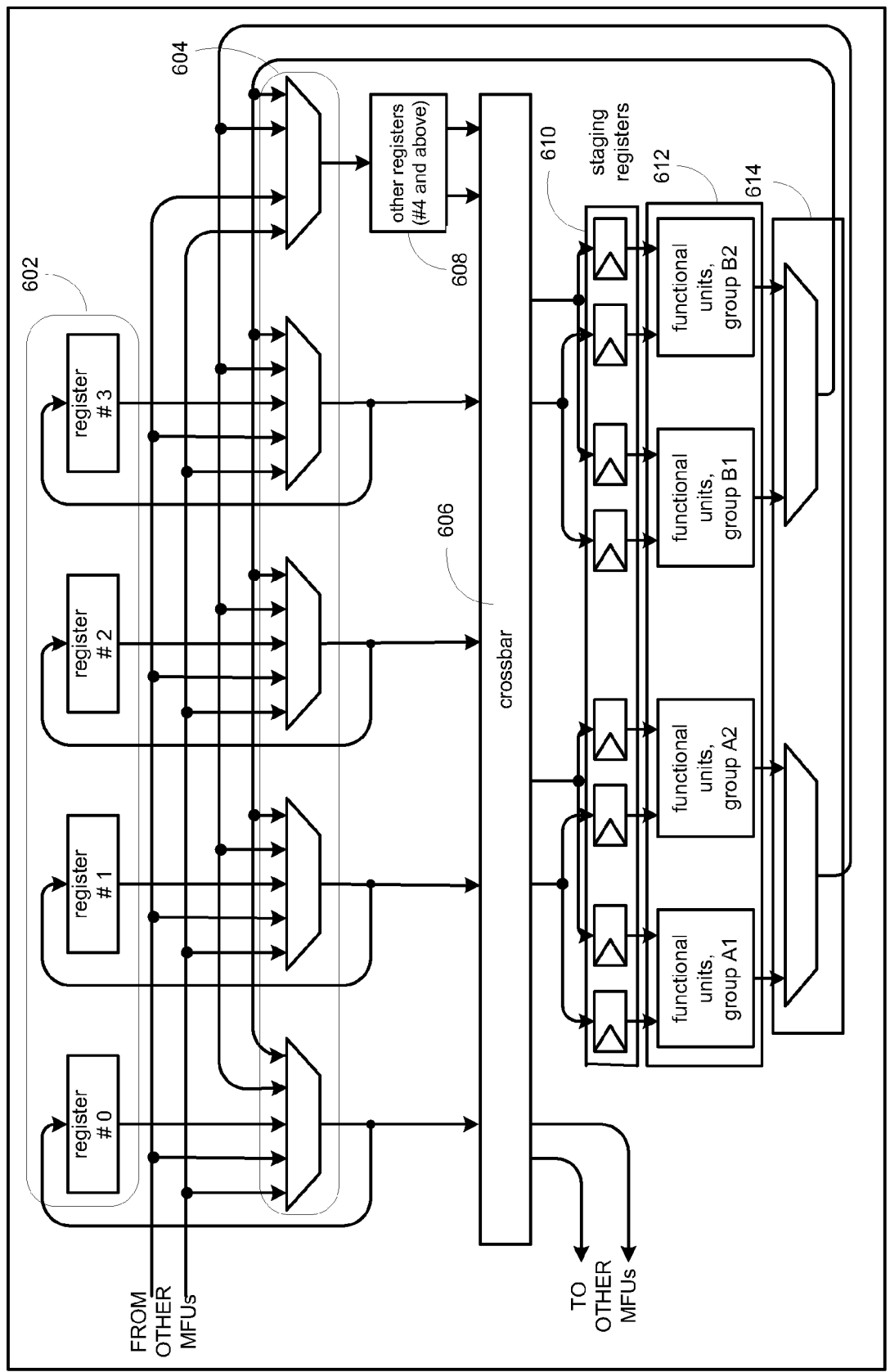
FIG. 6 shows in greater detail the general structure employed for register files and forwarding inside macro functional units, specifically in blocks 402, 404, 406, and 408.

FIG. 6 shows, in greater detail, the general structure employed for register files and forwarding inside macro functional units, specifically in blocks 402, 404, 406, and 408. In FIG. 6, a plurality of registers 602, a plurality of muxes 604, a crossbar 606, a register block 608, a plurality of staging registers 610, a plurality of functional units 612 and a plurality of muxes 614 are shown in accordance with an embodiment of the present invention. The registers 602 is shown coupled to the muxes 604, which are, in turn, shown coupled to the crossbar 606. The crossbar 606 is shown coupled to the registers 610, which are, in turn, shown coupled to the functional units 612 and the functional units 612 are shown coupled to the muxes 614. In general, the function of a mux is to select between the inputs it is provided and generate the selected input. The output of the crossbar 606 is also provided to other blocks of the FIG. 4. While a particular number of units, muxes and/or registers is shown in FIG. 6, other number of these structures may be employed.

The structures of FIG. 6 are coupled together in the manner shown therein. The muxes 604 are shown to receive an additional input from other blocks of FIG. 4, at least two such inputs, as well as the output of the muxes 614.

The registers and feedback paths (coupling) of FIG. 6 offers a unique organization to optimize the tradeoff of area, energy, and performance. This organization has three main characteristics:

Register files that are visible to the assembly language and have more than a few registers are broken into two subsets: a few registers are implemented with full accessibility, while the remaining registers are implemented with more limited accessibility. Only the first four registers (numbered 0 through 3) support full accessibility in most cases. For machine operations involving this register file, any and all of the fully accessible registers may be selected simultaneously as sources and destinations of the operations. In contrast, the registers with limited accessibility share only a small number of read and write ports between them. In the registers with limited accessibility have at most two read ports and one write port that they share. This arrangement gives most of the benefits of a register file with a large number of read and write ports without needing more than one or two read/write ports for most of the registers in the set.

At the inputs of every functional unit are "staging registers". Before a functional unit is used in a clock cycle, its input staging registers must be set at the end of the previous clock cycle with the proper input values. Functional units that cannot be in use simultaneously can be grouped together to share the same staging registers, so as to reduce the total number of registers. If none of the functional units that share the same staging registers is needed in a clock cycle, the previous values of the registers are held, thus eliminating transition power consumption in those functional units for that cycle.

Forwarding among functional units is implemented in two stages. First, the next values of the fully accessible registers are selected through multiplexers, along with the value or values, if any, to write to the registers with limited accessibility. In the second stage, the next values of the fully accessible registers, and the values from the read ports of the registers with limited accessibility, are together fed to a crossbar that selects the values to be written to the staging registers at the end of the clock cycle (and thus for the functional units in the next clock cycle). This organization minimizes the number of inputs to the crossbar, greatly affecting its size, at the possible cost of increased delay from going through two multiplexing stages rather than one.

Between the write and read ports of the registers with limited accessibility, forwarding may or may not be implemented. If forwarding is not done here, one extra cycle of latency will be apparent between an operation that writes one of these registers and a subsequent operation that reads it.

Figure 7:
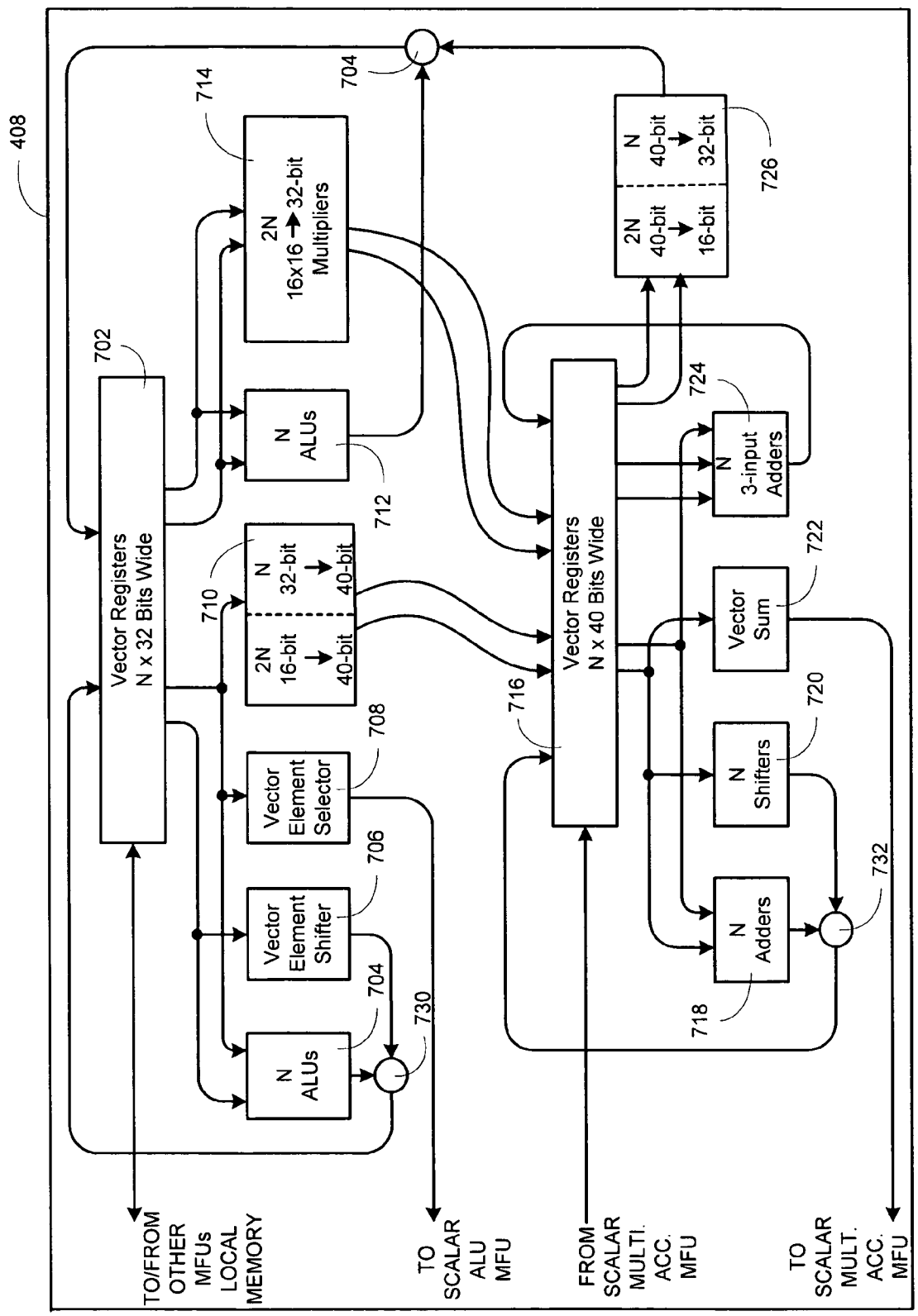
FIG. 7 shows further details of the block 408, in high-level block diagram form and accordance with an embodiment of the present invention.

FIG. 7 shows further details of the block 408, in high-level block diagram form and accordance with an embodiment of the present invention. In FIG. 7, a vector register block 702 is shown coupled to an N ALUs block 704, a vector element shifter block 706, a vector element selector block 708, a 2N and N bit converter block 710, an N ALUs block 712 and a 2N multipliers block 714. In FIG. 7, the block 408 is further shown to include a vector registers block 716 coupled to an N adders block 718, an N shifters block 720, a vector sum block 722, an N 3-input adders block 724, a 2N and N bit converter 726, a mux 723 and a mux 732. The blocks and muxes of FIG. 7 are coupled together in the manner shown in FIG. 7. the block 702 is coupled to other blocks of FIG. 4 and is further coupled to the blocks 704-714. The block 716 is shown to receive input from the block 406 and from the output of the mux 732, the block 710 and the block 714 as well as the block 724. The block 702 is shown coupled to a mux 704 and the latter is further coupled to the blocks 712 and 726. Generally, the circuits or blocks of FIG. 7 operate on vector type of values, such as an N number of M-bit value with M being an integer number of bits, in parallel.

The mux 732, receives as input, outputs generated by the block 718 and 720 and the mux 730 receives inputs generated by the blocks 704 and 706 and further generates an output that is received by the block 702. The output of the blocks 708 and 722 are provided to the block 406. N, as used herein is an integer value, for example, N ALUs is an N number of ALU circuits.

The blocks 702-714 and the mux 730 generally perform a multiply accumulate (MAC) function, whereas, the blocks 716-726 and the mux 732 perform an ALU function, however, the number of bits, in parallel, on which such MAC and ALU functions are performed is generally N times greater than the number of bits processed by the block 406. The blocks 704 and 712 are segmentable, that is, they are capable of selectably segmenting add operation. For example, in the case where N 32-bits are being processed, in parallel, in addition to being able to perform N 32-bit add operations, each ALU block is capable of performing 2N 16-bit add operations, or 4N 8-bit add operations. The block 714 functions in the same manner as that of block 1110 of FIG. 11, which will be described shortly. The blocks 710 and 726 function to convert N 32-bit values to N 40-bit values, or a 2N 16-bit values to 2N 40-bit values. In one example, a 32-bit value is converted to a 40-bit value and in another example, a 16-bit value is converted to a 40-bit value, thus, offering bit conversion capability.

The block 706 shifts a vector value, i.e. an N M-bit value, to the right or left by an integer value. An example of a vector shift would be to take a vector such as <a0, a1, a2, a3, a4, a5, a6, a7>, in this case eight values, and return the vector <a1, a2, a3, a4, a5, a6, a7, 0> or perhaps

<0, 0, 0, a0, a1, a2, a3, a4>.

These operations would not usually be interpreted as any sort of multiplication or division. The block 708 allows choosing a single element of a vector value, for example, a particular byte (eight bits) can be selected out of the vector value.

The block 720 functions in a similar manner as the block 706 and the block 726 functions in a similar manner as the block 710. The output of the blocks 712 and 726 are selectively provided to the block 702, through the mux 704 and the output of the blocks 706 and 704 are selectively provided to the block 702, through the mux 730. Furthermore, the outputs of the blocks 720 and 718 are selectively provided to the block 716 through the mux 732.

The block 722 performs an addition operation on a vector basis, whereas, the other blocks of the block 408 operate on an element basis. That is, the block 722 adds all of the elements of a single vector together and the blocks that operate on an element basis perform an operation on one or more of a selected and corresponding element(s) of different vectors.

The blocks 710 and 726 each allow a conversion from N or 2N, selectively. Further shown in FIG. 8, the output of the block 804 is fed back to the input of the block 802

Figure 8:
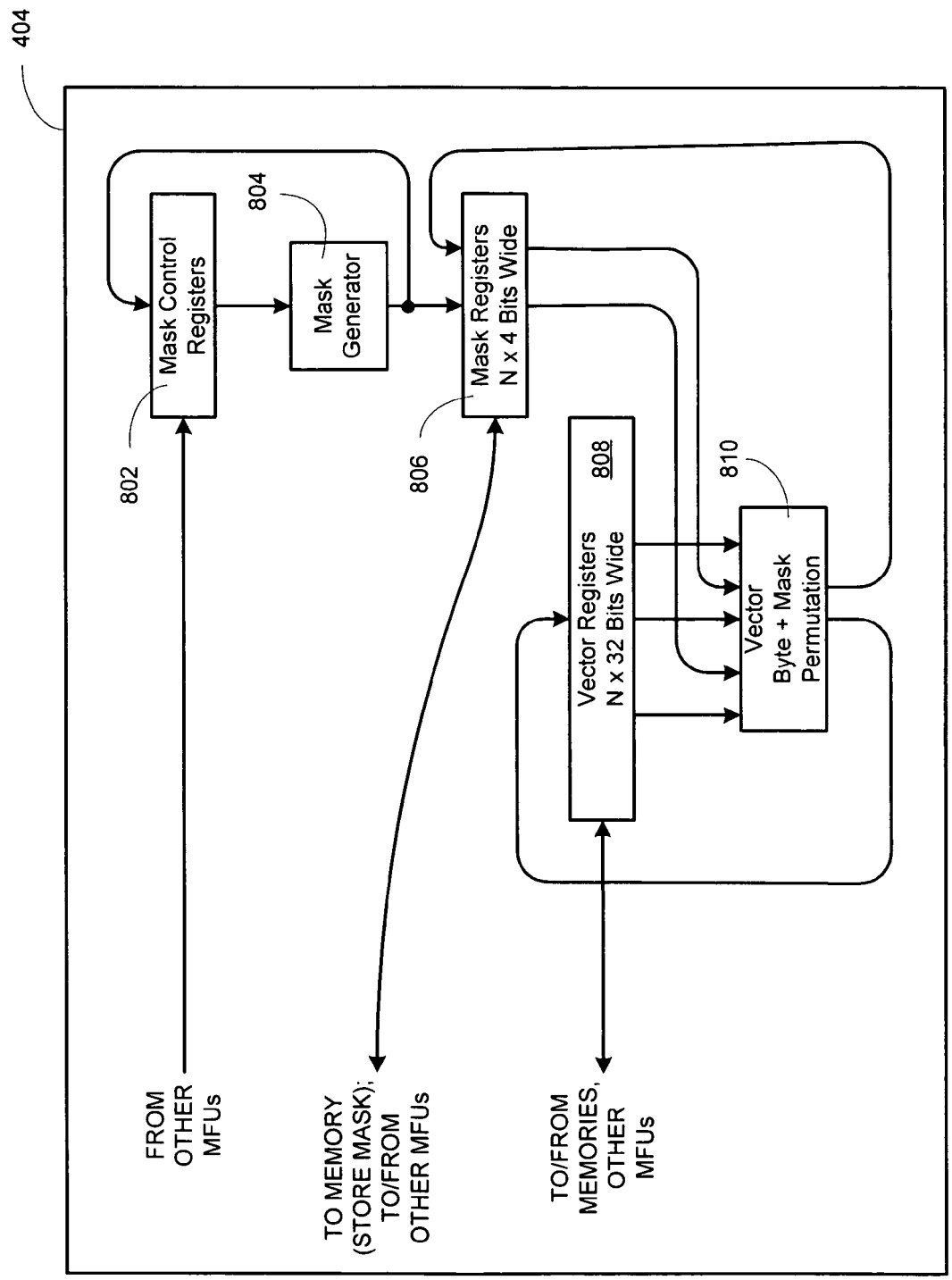
FIG. 8 shows further details, in block diagram form, of the block 404, in accordance with an embodiment of the present invention.

FIG. 8 shows further details, in block diagram form, of the block 404, in accordance with an embodiment of the present invention. In FIG. 8, the block 404 is shown to include a mask control registers block 802, a mask generator block 804, a mask registers block 806, a vector registers block 808 and a vector byte mask permutation block 810 coupled together in the manner shown in FIG. 8.

The block 802 is shown to receive input from other blocks of FIG. 4 and generates an input to the block 804, which is shown coupled to the block 806. The block 806 is shown coupled to the block 801 and is further coupled to the other blocks of FIG. 4, as well as the memory 312. The block 808 is shown coupled to the memory 312 and other blocks of FIG. 4. The block 810 is shown coupled to receive input from the blocks 806 and 808.

In one example, the block 404 has a register file, the block 808, of N*32-bit vector registers, for the same N as the block 408. The block 806 of the block 404 includes mask registers of size N*4 bits. Each bit of a mask register corresponds with one byte of a vector register. When an N*32-bit vector is stored to external shared memory, an N*4-bit mask can be supplied to indicate which bytes of the vector are actually to be written to memory. (Memory bytes corresponding to a zero bit in the mask are left unchanged.) A mask generator function computes a 4*N-bit mask based on the setting of a mask control register.

The block 404 can permute the 8*N bytes of two vector registers to choose 4*N bytes. In the general case, the specific permutation is controlled by the value of a third vector register. Certain "precoded" permutations do not require the use of a control vector; these include all funnel shifts left and right of the two input vector registers. At the same time that the 8*N bytes of two vector registers are permuted, the 8*N bits of two mask registers can be identically permuted to maintain the same bit-for-byte correspondence between mask and vector values.

The blocks of FIG. 8 operate on a vector value basis. The block 810 allows rearranging of vector values, such as previously indicated. This is done using permutations, which is further described with reference to FIGS. 9 and 10. The block 810 provides information regarding which permutation is to be expected. Similarly, a permuted mask from blocks 804 and 806 indicate which permuted masks are to be provided. Generally, there is one mask bit for every byte to be stored.

The blocks 802, 804, 806 and 810 of FIG. 8 cause the ability to rearrange addresses in memory to suit the particular application undergoing execution. In prior art techniques, rearranging is typically performed automatically, however, in the embodiments of the present invention, the programmer, in accordance with the program or code, can programmably perform rearrangement, as desired. This allows for a near infinite sets of rearrangements pursuant to the programmer's needs, which prior art techniques simply do not offer, i.e. the capability to rearrange is predetermined and includes a pre-determined set of rearranging possibilities. Thus, generating masks pursuant to the program being executed offers further flexibility vis-à-vis rearranging of addresses in memory.

SIMD is an acronym for _Single Instruction, Multiple Data_, and MIMD is _Multiple Instruction, Multiple Data_. These are standard terms in computer architecture and programming known to those skilled in the art.

Figure 9I:
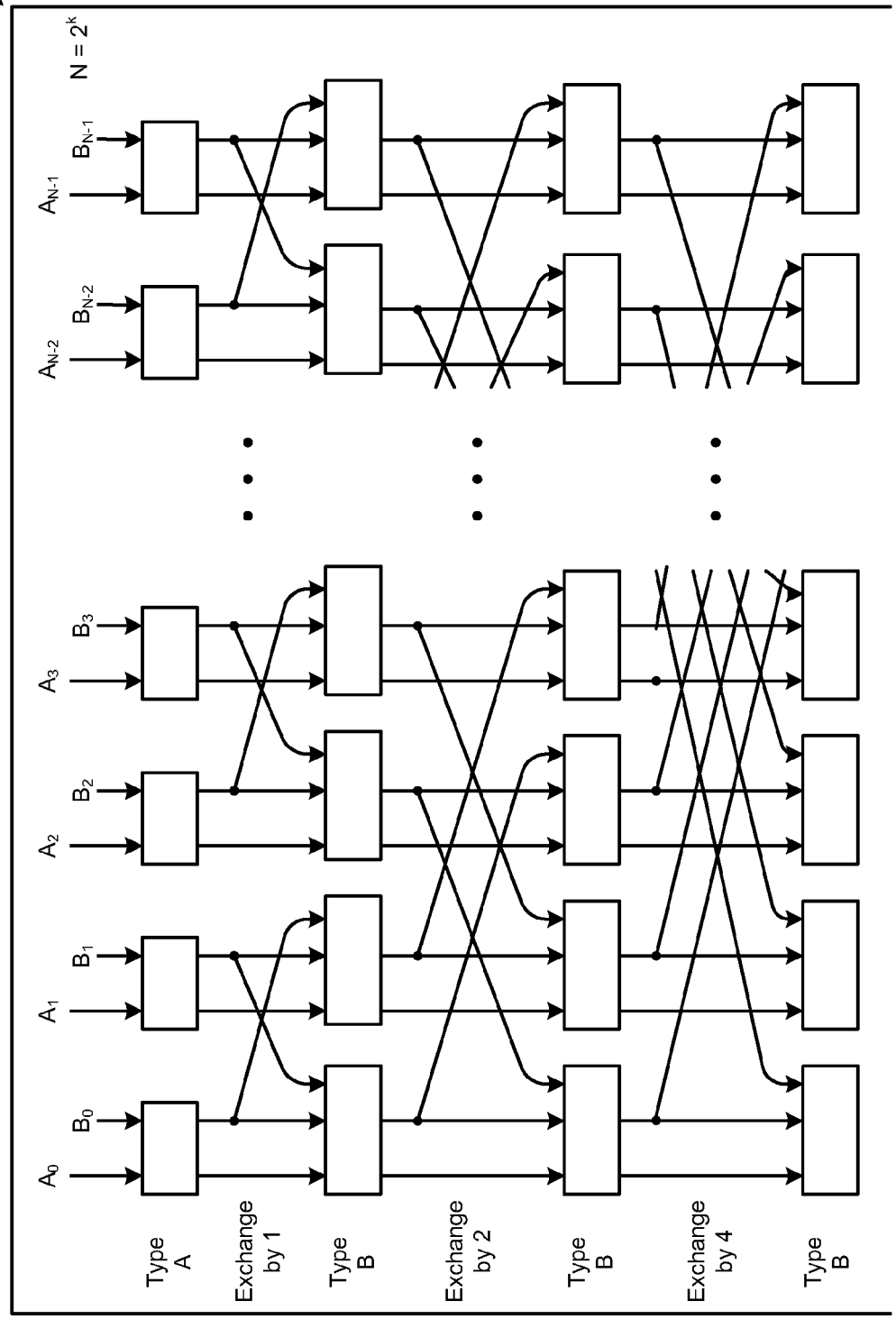
FIGS. 9 and 10 shows further details of the block 404, particularly with respect to performing permutations.
Figure 9I:
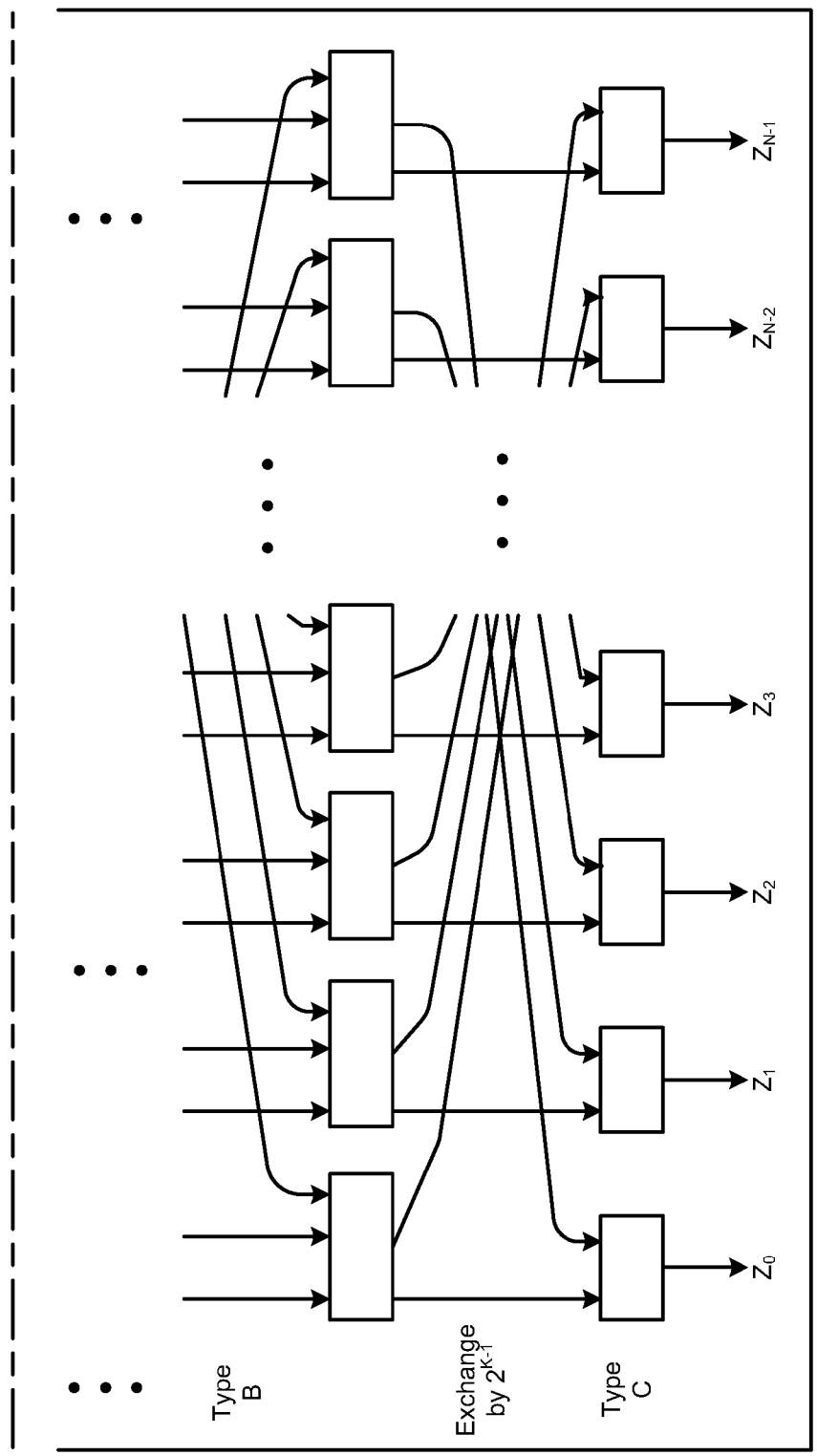
Figure 10:
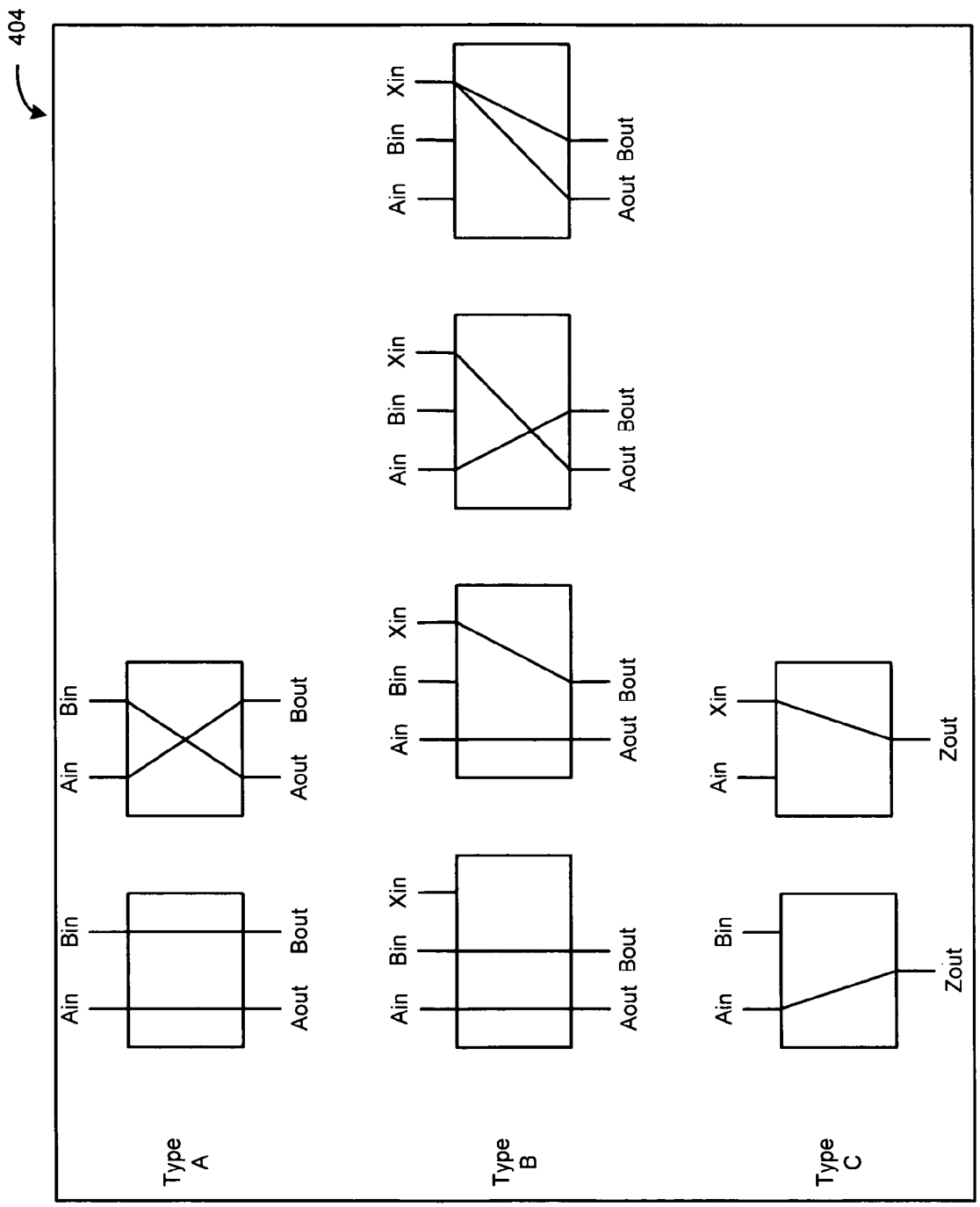

FIGS. 9 and 10 show further details of the permutation circuit of the block <number>. where <number> is the number for the "Vector Byte+Mask Permutation" box. The block 404 has a functional unit that performs a permutation of two vectors to generate a permuted result vector, as shown in FIGS. 9 and 10. The circuit used to perform the permutation can be described in a general way as taking two input vectors A and B, each of N units, and generating an output vector Z also of N units, where a unit is any arbitrary but uniform number of bits, and where N is required to be a power of 2. Let K be the log base 2 of N. The permutation circuit has K+1 stages, each with N switch boxes of a particular type, as shown in the figure. There are three types of switch boxes overall, called "type A", "type B", and "type C". Switch box type A is used only in the first stage; switch box type C is used only in the last stage; and all stages in the middle employ only switch box type B. The connections supported by each type of switch box are shown separately. Between the switch boxes of each pair of adjacent stages is a butterfly exchange, starting with an exchange of distance 1 and working up to an exchange of distance N/2. The settings of the switch boxes are all determined independently by a "control vector", which is a third input to the permutation circuit. Since the setting of each type A and type C switch box requires only a single bit to specify, and the setting of each type B switch box requires exactly two bits to specify, a complete control vector needs 2*K*N bits. The control vector may be implied entirely from the permutation instruction executed, or it may be supplied in part or in full by the program in some way.

Figure 11:
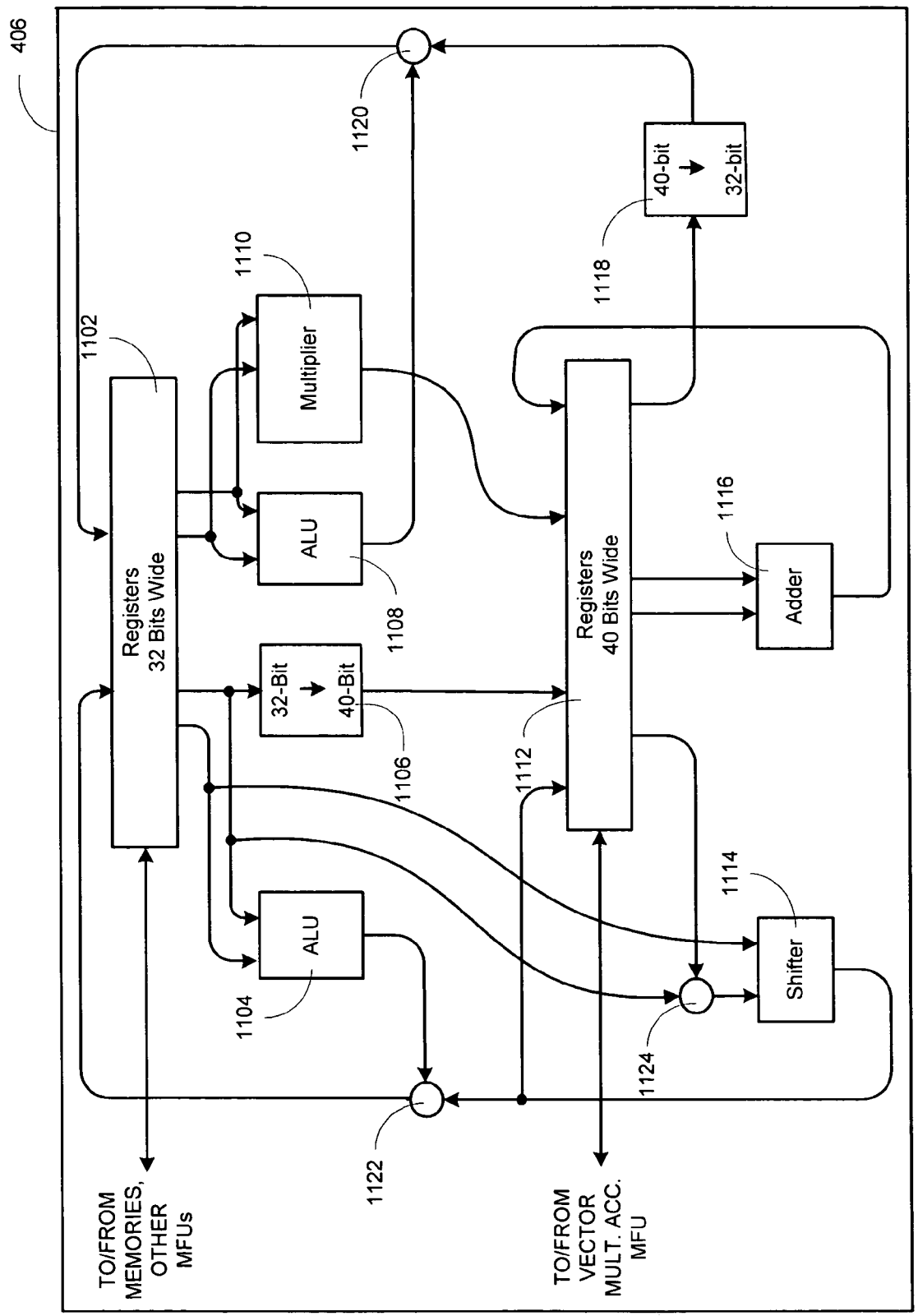
FIG. 11 shows further details of the components of the block 406, in block diagram form and accordance with an embodiment of the present invention.

FIG. 11 shows further details of the components of the block 406, in block diagram form and accordance with an embodiment of the present invention. In FIG. 11, a registers block 1102 is shown coupled to an ALU block 1104, a bit converter block 1106, an ALU block 1108 and a multiplier block 1110. The block 406 is further shown to include a register block 1112, a shifter block 1114, an adder block 1116 and a bit converter block 1118. Muxes 1122, 1120 and 1124 are also shown in FIG. 11. The muxes and blocks of FIG. 11 are coupled together in the manner shown therein.

The block 1102 is shown coupled to the memory 312 and other blocks of FIG. 4 and receives input from the mux 1122 and the mux 1120. The shifter block 1114 provides one of the inputs of the mux 1122 and the block 1104 provides the other input thereof. The mux 1120 receives its inputs from the blocks 1118 and 1108. The block 1114 is further shown coupled to the block 1102 and the mux 1124 is shown to receive inputs from the blocks 1112 and 1102 and generates an output to the block 1114.

The block 1112 is shown coupled to the block 1116, which generates an output provided as input to the block 1112. The block 1118 is shown coupled to the block 1112 and blocks 1106 and 1110 are shown coupled to the block 1112.

The blocks 1102, 1104, 1106, 1108 and 1110 and the mux 1122 cause an ALU function to be performed while the blocks 1112-1118 and the mux 1124 cause an a multiply-accumulate (MAC) function to be performed.

The blocks 1104 and 1108 are ALUs and perform such functions and their output is selectively, through the muxes 1122 and 1120, provided as input (or feedback) to the block 1102. In every clock cycle, two ALU operations may be performed. The block 1110 performs a multiply function and produces an output that is provided to the block 1112, which is capable of processing a higher number of bits, in parallel, than that of the block 1102. For example in the case where the block 1102 has a 32-bit capability, the block 1112 has a 40-bit capability. The block 1112 serves an accumulator register, i.e. adding inputs accumulatively.

The block 1106 converts an N-bit value to an N+X, where X is an integer value. For example, a 32-bit value can be converted to a 40-bit value. The block 1114 shifts a value by a predetermined number of bits and passes the result to the block 1102, through the mux 1122.

The block 1118 converts from a higher number of bits to a lower number of bits, such as 40 bits to 32 bits. The block is coupled to the block 408. The block 406 can execute two ALU operations in parallel on values from the block 1102. In place of the first ALU operation, an N-bit shift operation may be performed, or a conversion of an N-bit value to a X-bit value to be stored in the block 1112. In place of the second ALU operation, a multiplication may be performed by the block 1110 and the result stored in one of the registers of the block 1112.

The block 406 can, in parallel, perform a 40-bit shift, a 40-bit add/subtract, and a conversion of a 40-bit value to a 32-bit one to be stored in one of the Scalar ALU MFU's 32-bit registers.

Further details of one of the N-type sub-processors, such as the block 78 will now be discussed with reference to figures to follow. It should be noted that the blocks 406 and 404 of FIG. 4, relative to the W-type sub-processor, are common to N-type sub-processors, such as the block 78.

Figure 12:
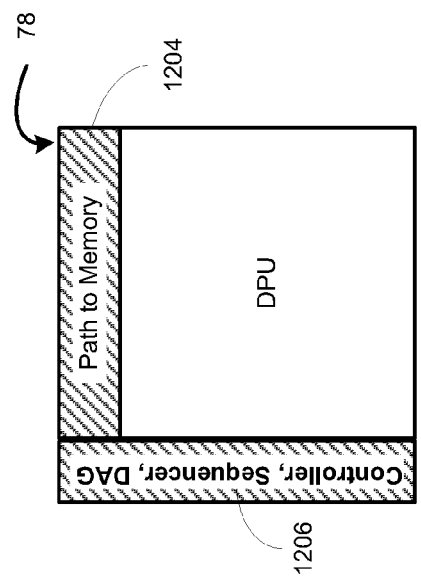
FIG. 12 shows a high level block diagram of the details of the block 78 in accordance with an embodiment of the present invention.

FIG. 12 shows a high level block diagram of the details of the block 78 in accordance with an embodiment of the present invention. In FIG. 12, the block 78 is shown to include a data path unit (DPU) block 1202, a path to memory block 1204 and a controller, sequencer and data address generator (DAG) block 1206. Blocks 1204 and 1206 are in common with and found in the blocks of the W-type sub-processors. The block 1206 is generally functionally the same as the block 402.

Figure 13:
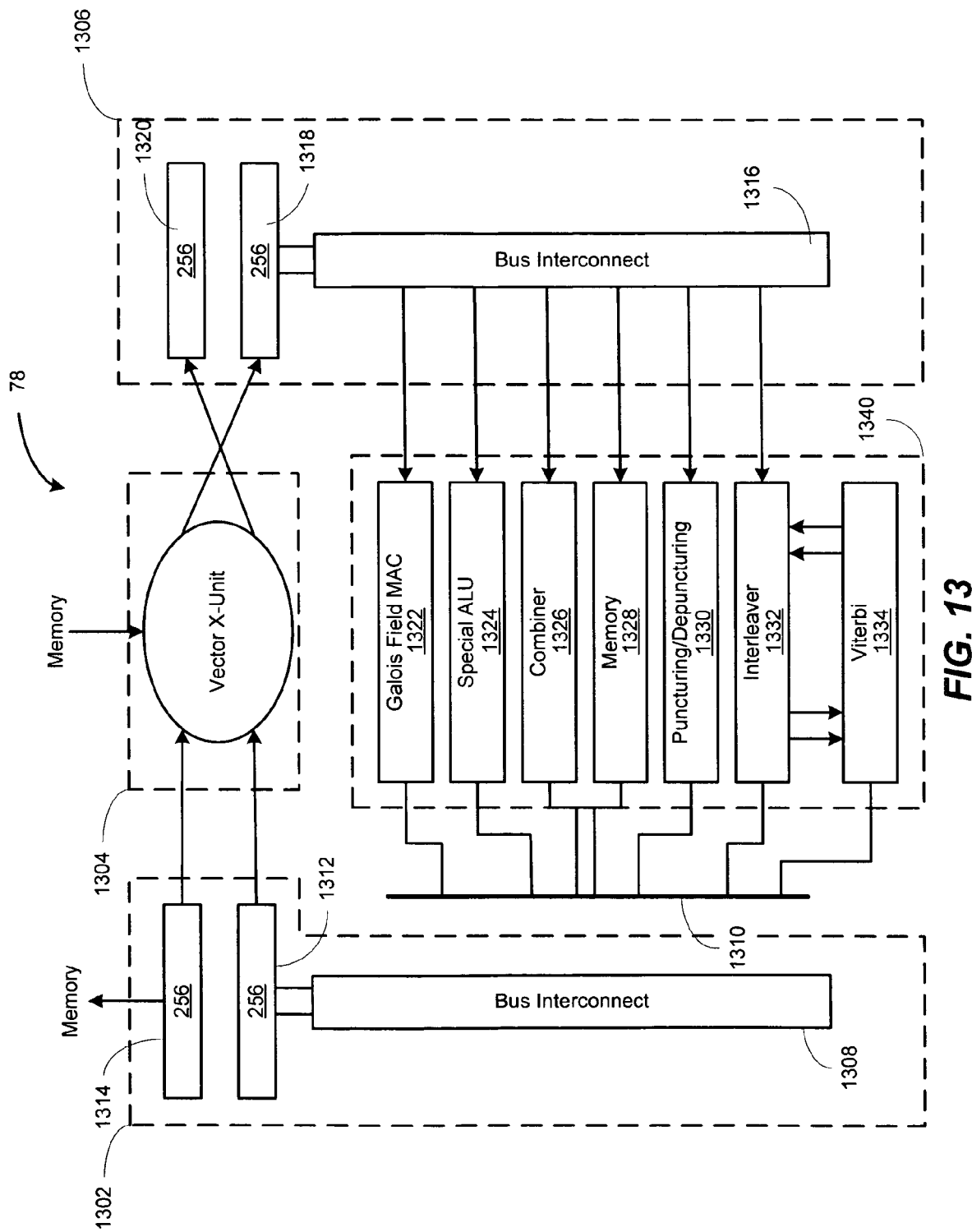
FIG. 13 shows still further details of the block 78, in high level block diagram form, in accordance with an embodiment of the present invention.

FIG. 13 shows still further details of the block 78, in high level block diagram form, in accordance with an embodiment of the present invention. In FIG. 78, a store unit block 1302 is shown coupled to an X unit block 1304, which is, in turn, shown coupled to a load unit block 1306. The block 1304 is generally functionally the same as the block 404 and thus, is discussed in further detail hereinabove.

The block 1306 is shown further coupled to the macro function blocks 1340, which is, in turn, shown coupled to the block 1302 through a macro function bus 1310. The block 1302 is shown to include a store buffer 1314, a store buffer 1312 and a bus interconnect block 1308. The block 1302 generates an output provided to memory, such as the memory 312 and therefore coupled accordingly through the block 1314. The block 1304 is shown to receive input or be coupled to memory, such as the memory 312. The block 1306 is shown to include a load buffer 1320, a load buffer 1318 and a bus interconnect block 1316, which is coupled to the blocks 1340.

The blocks 1340 are shown to include a Galois field MAC block 1322, a special ALU block 1324, a combiner block 1326, a memory 1328, a puncturing/depuncturing block 1330, an interleaver block 1332 and a viterbi block 1334, which are each shown coupled to the bus 1310. The blocks 1322-1332 are each shown to receive input from or be coupled to the block 1316. The block 1334 receives input from the block 1332 and is coupled to receive and generate data thereto.

The flow of data is such that data or information flows in from and through the block 1306 to the blocks 1340 and then to the block 1302 and out onto memory. In this manner, a pipeline affect is introduced wherein multiple operations overlap and are processed concurrently, in a pipeline fashion. For example, information may be loaded by the block 1306 while information is being stored into memory by the block 1302. Data is stored in the blocks 1320 and 1328 of the block 1306 after being received by the block 1304 from memory and subsequently provided to and processed by the blocks 1340, the details of which will be discussed shortly with respect to subsequent figures.

Upon completion of processing by the blocks 1340, the processed data is provided to the block 1302, through the bus 1310, and stored in the blocks 1312 and 1314 wherein they are stored until coupled to be received by memory. The buffers of the blocks 1314, 1312, 1318 and 1320 are of a predetermined width or number of bits, in parallel. In one example, each of these buffers is 256 bits wide, however, other number of bits may be employed.

A value or data, that may have been processed by the blocks 1340, may be moved from the block 1302 to the block 1306 for re-use. Furthermore, data may be received by the block 1304 from memory and then moved tot the block 1306 for processing thereof. Further details of each of the blocks 1340 are now presented. The blocks 1314 and 1312 cause a double buffering effect, which assists in reducing "stalling" commonly experienced in pipelining operations, as do blocks 1318 and 1320. Stalling results from access of blocks 1302 and 1306 simultaneously by memory. In another embodiment, the blocks 1314 and 1312 may be one block and the blocks 1318 and 1320 may be one block.

A latency may be associated with an operation or a pipeline affect may be present. The latency may result from each of the blocks with the blocks 1340.

Figure 14:
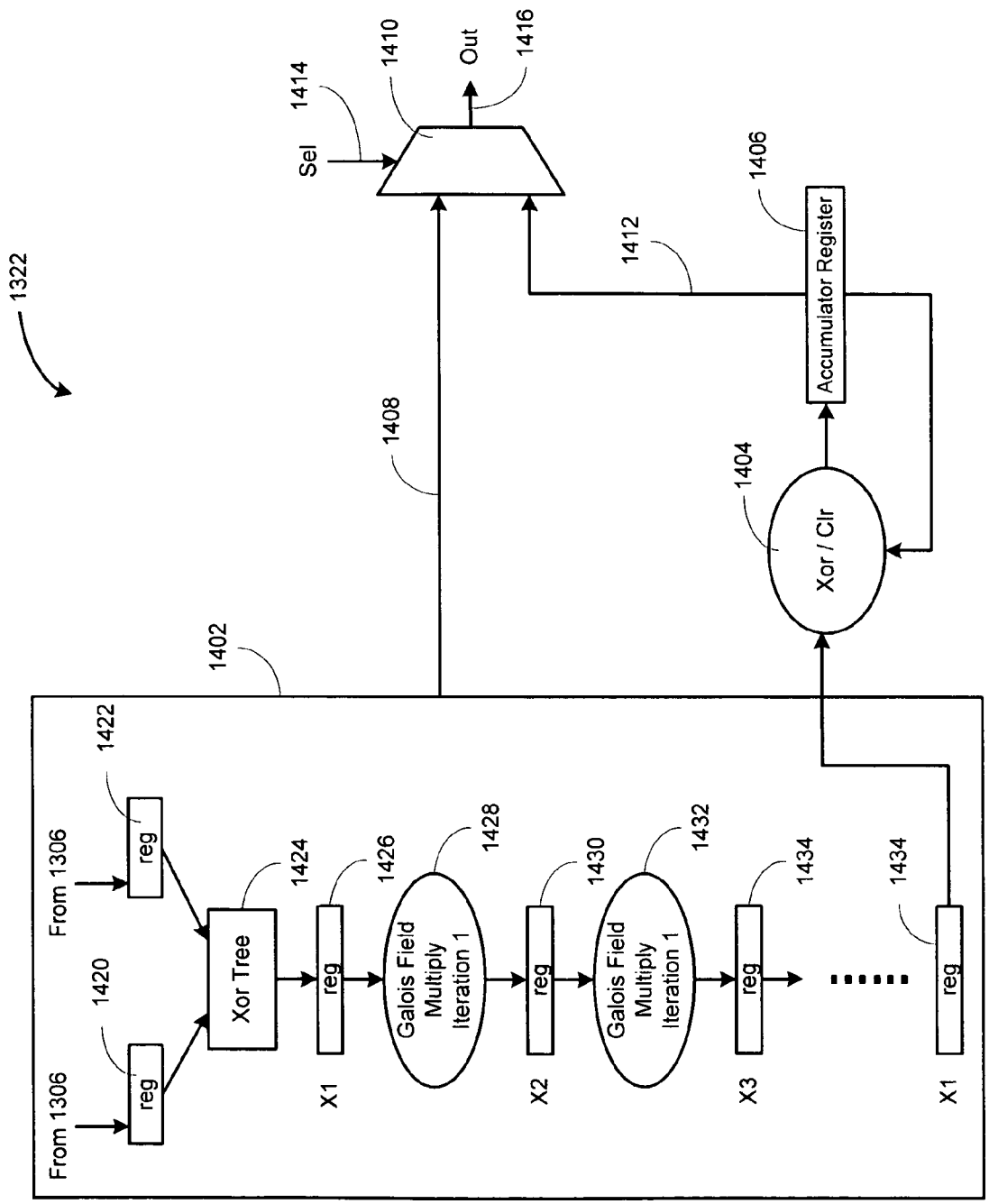
FIG. 14 shows further details of the block 1322 in accordance with an embodiment of the present invention.

FIG. 14 shows further details of the block 1322 in accordance with an embodiment of the present invention. In FIG. 14, a Galois field block 1402 is shown coupled to an XOR/Clr circuit 1404, which is, in turn, shown coupled to an accumulator register block 1406. The block 1402 is shown to generate a Galois field output signal 1408 which serves as input to a Galois field mux 1410, which further receives another input, generated by the output of the block 1406 and referred to as the accumulator register block output signals 1412. The signals 1408 and 1412 serve as inputs to the mux 1410 for selectively generating a Galois field MAC output signal 1416, which is coupled onto the bus 1310 of FIG. 13. A select signal 1414, which serves as another input to the mux 1410, functions to select one of the signals 1408 and 1412 for generation of the signal 1416. Accordingly, either the output of the block 1402, which is effectively the result of the Galois field operation is provided as the output of the block 1322 or the Galois field MAC operation result is provided as the output of the block 1322.

The output of the block 1406 is shown coupled to the circuit 1404 as another input thereof. The output of the block 1404 is provided to the block 1406, such coupling effectuates the MAC part of the Galois field MAC operation. The block 1404 effectively performs an XOR multiply operation typically used in Galois field MAC operations.

The block 1402 is shown to include a register block 1420 and a register block 1422, which are shown coupled to an Xor tree block 1424. The block 1420 is further shown to include a register block 1426, a Galois field multiply iteration 1 1428, a register block 1430, a Galois field multiply iteration 1 1432, a register block 1434 and a register block 1436. While not shown in FIG. 14, an additional number of register blocks, such as the blocks 1434 and 1436 are included and coupled, in series, between the blocks 1434 and 1436.

The block 1424 is shown coupled to the block 1426, which is, in turn, shown coupled to the block 1428, which is, in turn, shown coupled to the block 1430, which is, in turn, shown coupled to the block 1432, which is, in turn, shown coupled to block 1434, which is coupled to either the block 1436 or one or more register blocks intermediately located between the blocks 1434 and 1436.

In FIG. 14, the blocks 1420 and 1422 receive input from the block 1306 and in another embodiment may be combined into one block. The block 1402 generally performs Galois field processing known to those of ordinary skill in the art and the remaining blocks of FIG. 14 cause performance of a MAC operation. The blocks 1426, 1430, 1434 and 1436 serve as different iterations of a Galois tree and it has been experienced that in a worst case scenario, the number of iterations is eight thus requiring eight register blocks. The multiply portion of the MAC operation is generally performed by an XOR operation performed by the circuit 1404 and the block 1406 serves as the accumulator function. The circuit 1404 receives its input from the last iteration of the Galois field operation performed by the block 1402 and in the case of FIG. 14, the block 1436.

In operation, the block 1322 operates on an N-bit value or data, such as an 8-bit value, and based on the same generates an N-bit value or data by shifting the original value eight ways based on another N-bit value. The N-bit values are then XORed by the block 1404 until the result is reduced to N bits with a reduction constant and optionally added with the contents of an N-bit accumulator register, such as a value in the block 1406. A "Clear" operation may also be performed by the block 1406. Example of applications employing Galois field MAC operations and therefore block 1322 include but are not limited to cyclic redundancy code (CRC) operations, convolutional encoder operations, scramble code generator operations and others.

Figure 15:
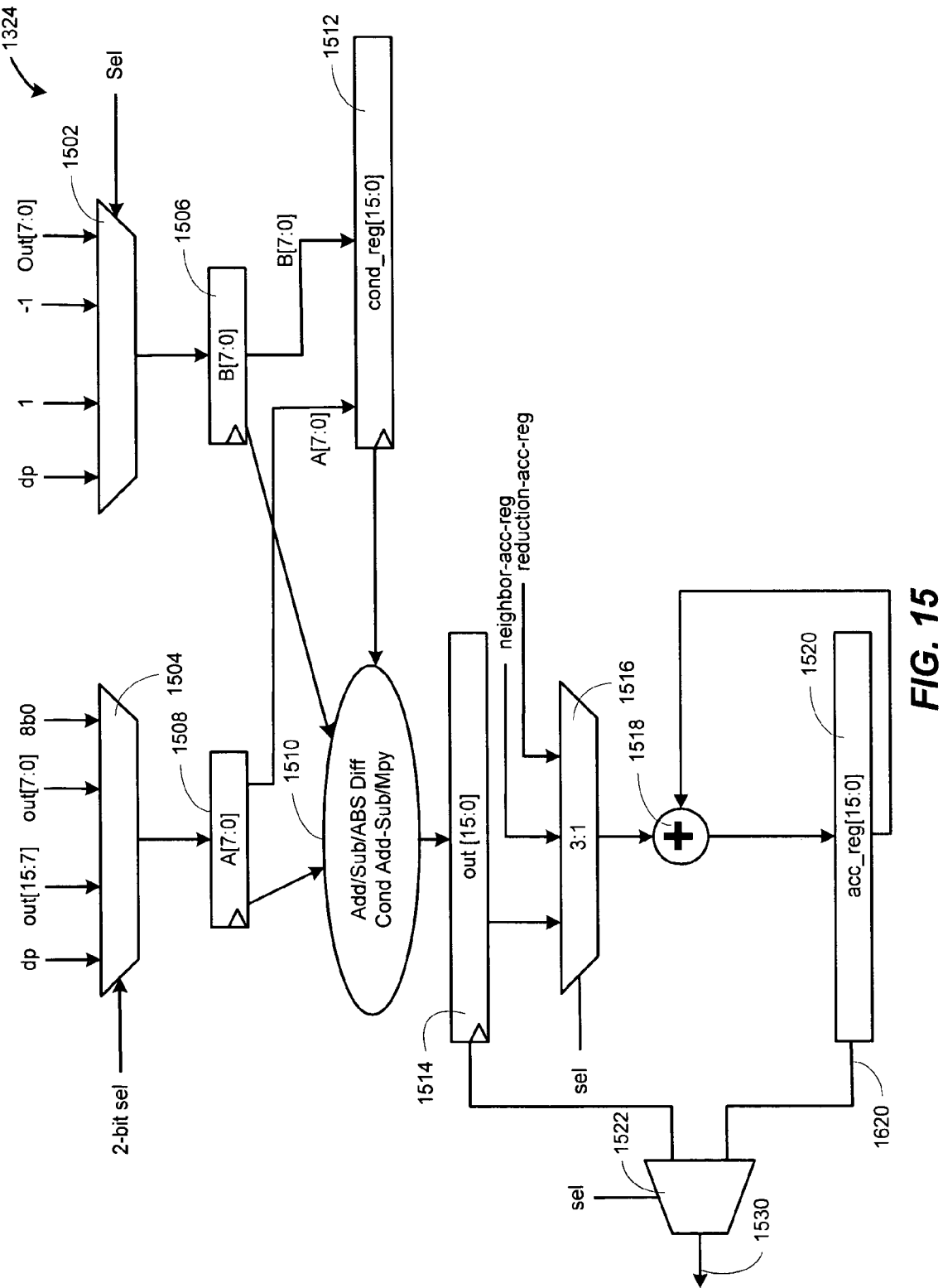
FIG. 15 shows further details of the circuitry included in the block 1324, in high-level block diagram form and accordance with an embodiment of the present invention.

FIG. 15 shows further details of the circuitry included in the block 1324, in high-level block diagram form and accordance with an embodiment of the present invention. In FIG. 15, muxes 1504 and 1502 are shown coupled, respectively, to an A register block 1508 and a B register block 1506. The block 1508 stores a value, referred to as A and the block 1502 stores a value referred to as B and these A and B values are data to be operated thereon by the block 1324. The A and B values are each N-bit wide.

The blocks 1508 and 1506 are shown to generate inputs to a conditional register block 1512 and further shown coupled to generate inputs to the add/sub/Abs/diff/conditional add-sub/multiply (AGU) block 1510, which, in turn, generates input to the output register block 1514. The block 1514 is shown coupled to a mux 1516, which is, in turn, shown coupled to an adder 1518. The adder 1518 is shown coupled to an accumulator-register block 1520, the output of which is shown to serve as another input of the adder 1518. Another output of the block 1520 is shown to serve as input to a mux 1522, which receives, as another input as output of the block 1514. The mux 1522 generates an output 1530 which is coupled to the bus 1310. Some of the inputs to the muxes 1504 and 1502 are received from the block 1316.

Each of the muxes 1504 and 1502 is shown to receive four inputs. One of the inputs of the mux 1504, dp, is received from the block 1306, as is the input, dp, of the mux 1502. Another input of the mux 1504 comes from a series of the lowest-order bits of an output of the block 1514, as does one of the inputs of the mux 1502. Another input of the mux 1504 comes from the highest-order of bits of the same output of the block 1514. Yet another input of the mux 1504 is a value '0'. One of the inputs of the mux 1502 is the value '1' and another one of its inputs is the value '−1'. The values '0', '1' and '−1' are provided in an effort to expedite the operations performed by the block 1324 in that it has been experienced that these values are repetitively utilized in various operations and therefore there presence increases system performance. It should be noted that there might be a plurality of the blocks 1510 utilized for increased performance. The block 1324 is organized as shown in FIG. 15 to allow many of the operations performed thereby to be performed in a single clock cycle.

In operation, the blocks 1510 and 1512 operate on the A and B values provided by the blocks 1508 and 1506, respectively. Two other inputs to the mux 1516 are generated by a reduction operation block within the block 1520 (not shown in FIG. 15), which will be discussed shortly. For now, these two inputs are referred to as 'neighbor-acc-reg' and 'reduction-acc-reg', each being 2N wide.

The block 1512 is a 2N wide register that allows conditional add or conditional subtract operations to be performed by the block 1510 for use in despreading operations. The block 1512 essentially modifies the A and B values for use by the block 1510.

The mux 1522 allows essentially the output of the block 1510 upon having been stored by the block 1514 to be selectively provided to the block 1302, through the signal 1530, and as determined by a select signal provided as yet another input to the mux 1522. Otherwise, the result of the block 1510 undergoes an accumulation-add operation, the final result of which is stored in the block 1520, through the blocks 1518 and 1520 prior to being provided to the block 1302.

The block 1324 is an N-layer ALU including one or more ALUs that support the following operations:

N add/subtract operations wherein two N-bit values are operated thereon to generate sum or differences thereof N-bit XOR on two input values Maximum/Minimum operation on two N-bit input values Maximum* operation on two N-bit input values such that the result thereof is calculated as follows: max(a,b)+constant (from memory or a small preloaded look-up table)

Conditional Add-subtract: This function, which, in general, results from use of the block 1512, conditionally adds or subtracts a stream of N-bit values depending on the input code. The input code is pre-loaded into a control register. A '1' in the input code results in a subtract operation an '0' results in an add operation. The output is available in a 16-bit accumulator register. There is also support for a "gather" operation from other special ALUs that support this operation.

SAD using the same accumulator as in the conditional add-subtract operation.

N×N multiply

The block 1510 is common to the W-type sub-processor wherein each block 1510 is capable of reading at least 128 bits and thus, the two blocks are capable of reading at least 256 bits of data every clock cycle when there is no contention in memory.

Figure 16I:
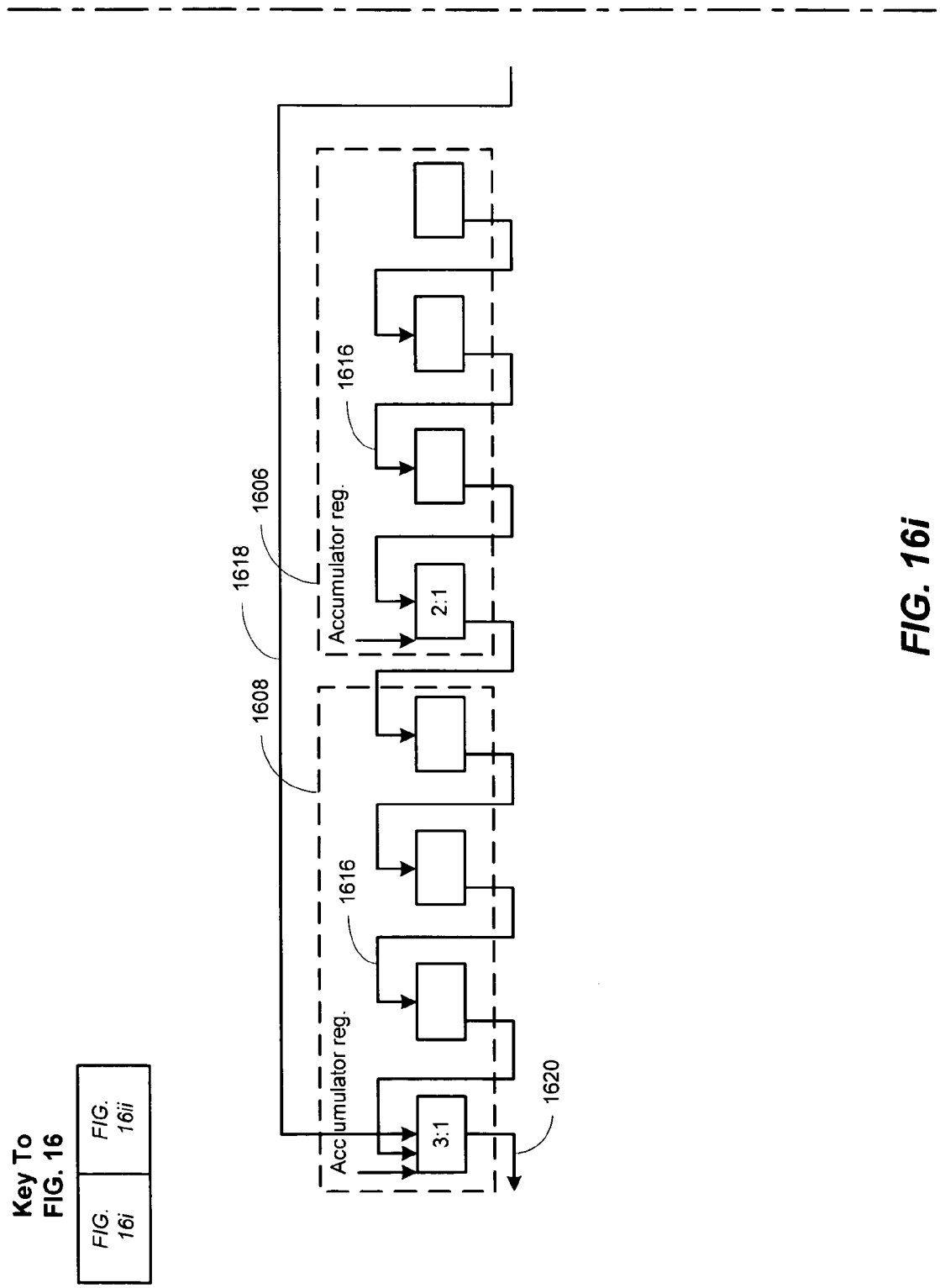
FIG. 16 shows a block diagram of a reduction circuit block 1602, included within the block 1520, in accordance with an embodiment of the present invention.
Figure 16I:
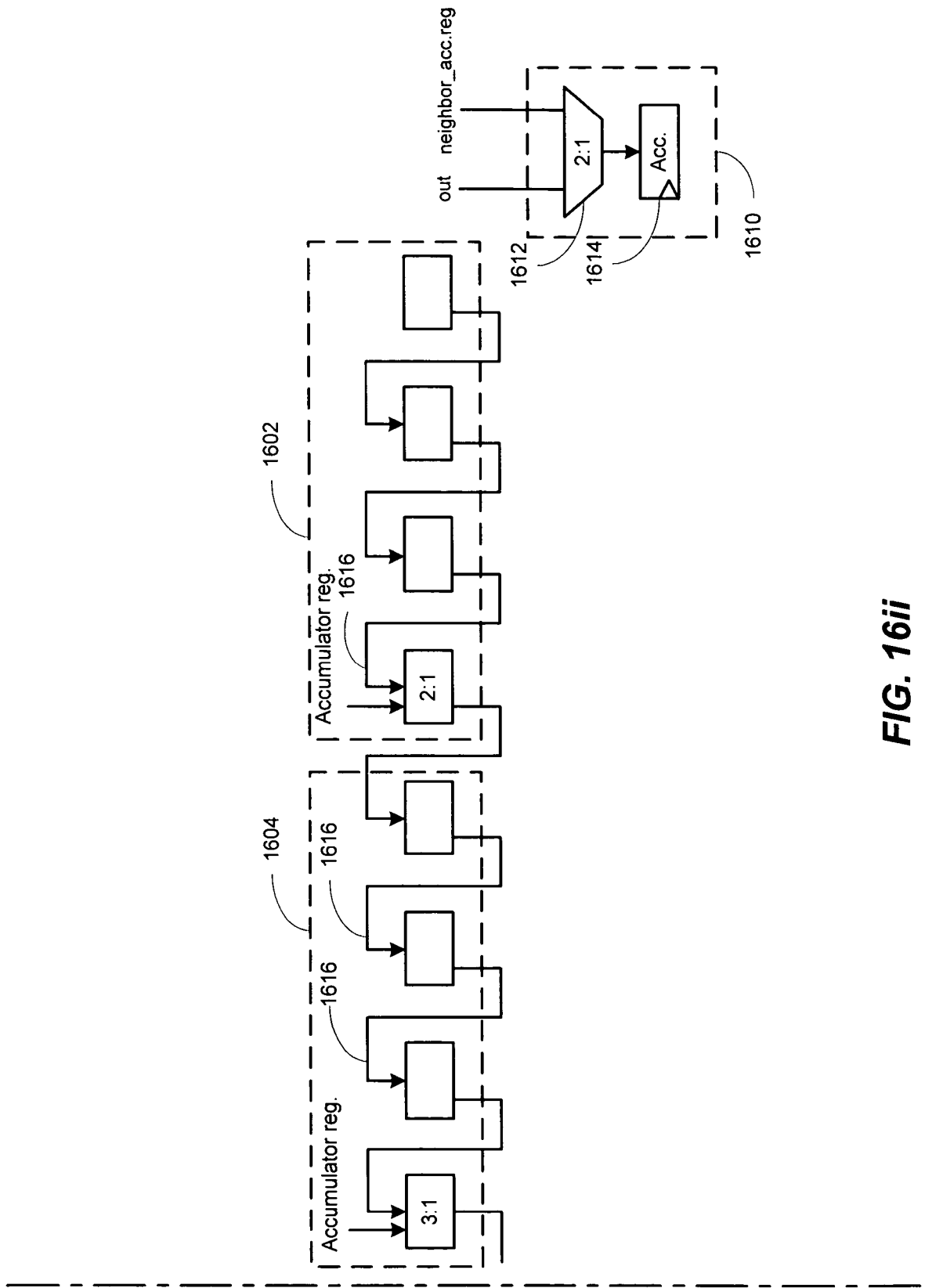

FIG. 16 shows a block diagram of a reduction circuit block 1602, included within the block 1520, in accordance with an embodiment of the present invention. In FIG. 16, an M-stage accumulator-register circuit, the details of each of the accumulator-register circuits of which are shown in the acc-reg block 1610 is shown. For example, the acc-reg circuit block 1602 includes four of the blocks 1610 coupled in the manner shown in FIG. 16. Similarly, each of the acc-reg circuit blocks 1604-1608 include a four stage acc-reg circuit, such as that of block 1610. The output or result of each of the stages within each of the blocks 1602-1608 is used as input to the next stage and therefore added to achieve an accumulation. The blocks 1602-1608 are each shown to include 4 stages or 4 blocks such as the block 1610 but other number of blocks or stages may be employed.

The result of each of the blocks 1602-1608 is made available to another block. For example, the result of the block 1602 serves as input to the block 1604, the result or output of the block 1604 serves as input to the last acc-reg block within the block 1608 and the result or output of the block 1606 serves as input to the block 1608. Because the results of the blocks are provided in a forward manner and simultaneously with the accumulation of the stages within a block, only seven cycles are required to perform a reduction operation when a four-stage acc-reg block is employed.

The block 16 is comprised of a mux coupled to an accumulator. The mux is a 2:1 mux selecting one of two inputs to be provided to the accumulator. One of the two inputs of the mux of block 1610 is provided by the output of the block 1514 and the other input is the result of the previous-stage acc-reg block. In this manner, the reduction function of FIG. 16 is flexible in its manipulation of data. Each of the inputs from an immediately preceding output of a stage is referred to as a 'neighbor' signals 1616 generating the neighbor-acc-seq input to the mux 1516. The output of the some of the stages generates the reduction-acc-seg to the mux 1516 and is referred to as the 'reduction' signals 1618. The output of the last acc-reg block of the block 1608 generates the output 1620 coupled to the mux 1530. The reduction circuit of FIG. 16 results in minimal clock cycles for performing a reduction operation while saving power consumption.

Figure 17:
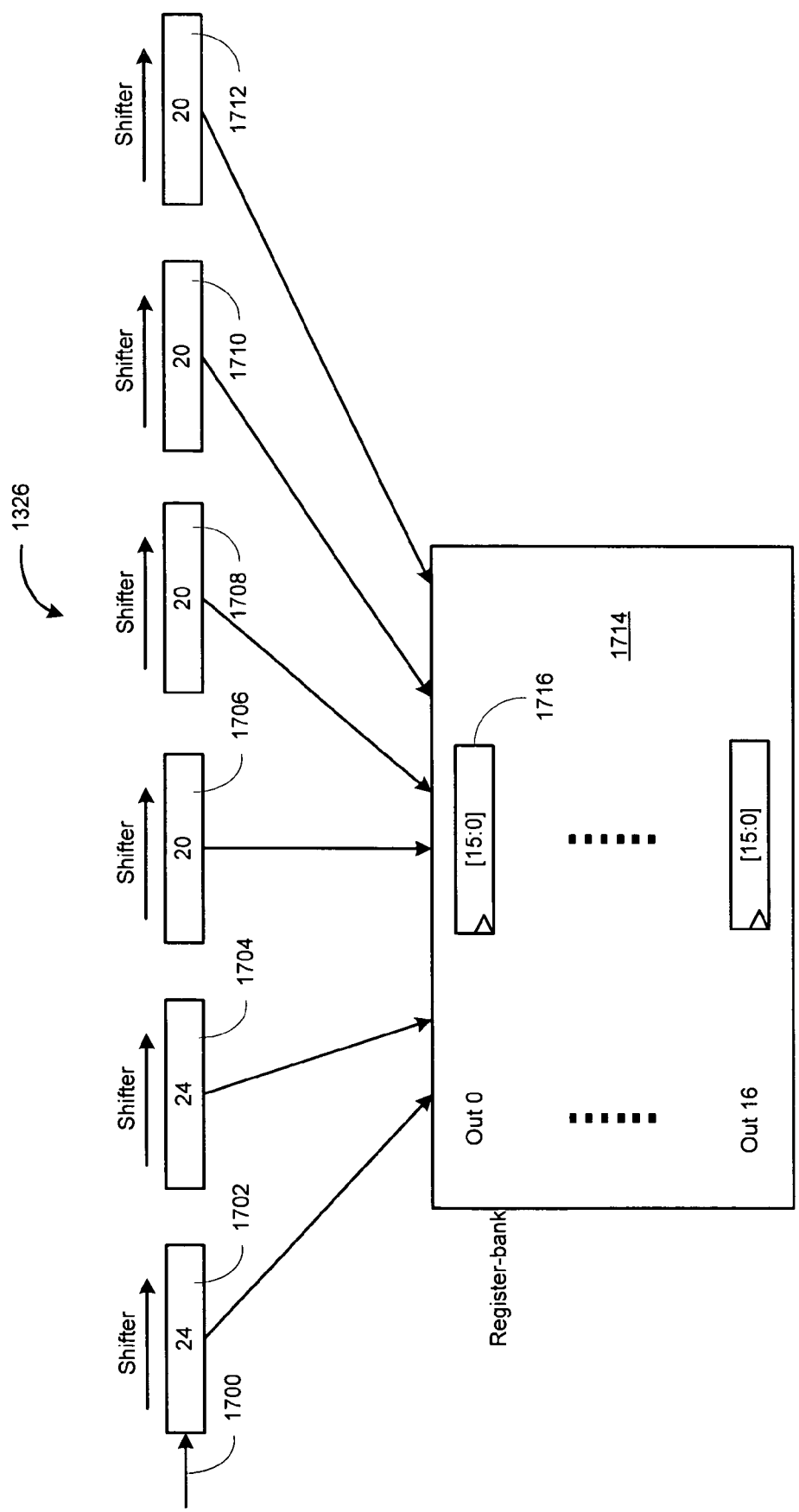
FIG. 17 shows further details of the circuitry included in the block 1326, in high-level block diagram form and accordance with an embodiment of the present invention.

FIG. 17 shows further details of the circuitry included in the block 1326, in high-level block diagram form and accordance with an embodiment of the present invention. In FIG. 17, the block 1326 is shown to include shifters 1702-1712 for shifting the data input received from the block 1306. In one embodiment, the input 1700 is 128 bits, however, other number of bits may be employed. The output of each of the shifters 1702-1712 is shown coupled to a register bank block 1714. The shifters 1702-1712 generate different combinations of bits of the input 1700.

The block 1714 includes a plurality of registers including the registers 1716 through 1746 that used to create a combination of output of the shifters 1702-1712. For example, the lower eight bits of each of the shifter 1702-1712 output can be made to go through a mux to selectively choose which of the lower eight bits are to be ultimately generated. Thus, each of the registers of the block 1714 can arbitrary select among an "interesting position" of shifted bits. The interesting position is determined by the output of each of the shifters 1702-1712. The output of the block 1714 is provided to the bus 1310.

Thus, in one embodiment of the present invention, the block 1326 comprises four 20-bit and two 24-bit input registers. It includes eight 16-bit registers where random 32, 16, 8 and 4-bit combinations of bits from its input registers is created and stored. The block 1326 can be used in three modes: Using two specific 20-bit registers for output generation; 2) Using four 20-bit registers for output generation; or 3) Using all seven registers for output generation. The shifters 1702-1712 include input registers not shown due to the known structure and function of a shifter by those skilled in the art.

In order to reduce the hardware or number of blocks or circuits required to perform the combining function of the block 1326, each bit in the 32-bit output register can only be filled from the least significant 8-bits in the two 20-bit registers in the fist mode, the 4 least significant bits in the four 20-bit registers in the second mode, and the 2 least significant bits from the four 20-bit registers and 4 least significant bits in the 24-bit registers in the third mode. Random combinations from the input registers is a two-step process where the first step involves shifting the "interesting' bit s to the least significant positions from where random filling into the output register can be allowed in that mode. In the example used herein with respect to FIG. 17, the block 1326 can create 16 combined bits every cycle when pipelined with the shift operation on the input registers to get the interesting bits into the least significant positions. Some combinations of output may take multiple clock cycles.

The memory 1326 is a generic random access memory and will therefore not be discussed in further detail: Suffice it to say however, that the size of the memory is based upon the applications for which the N-type sub-processor is to be used.

Figure 18:
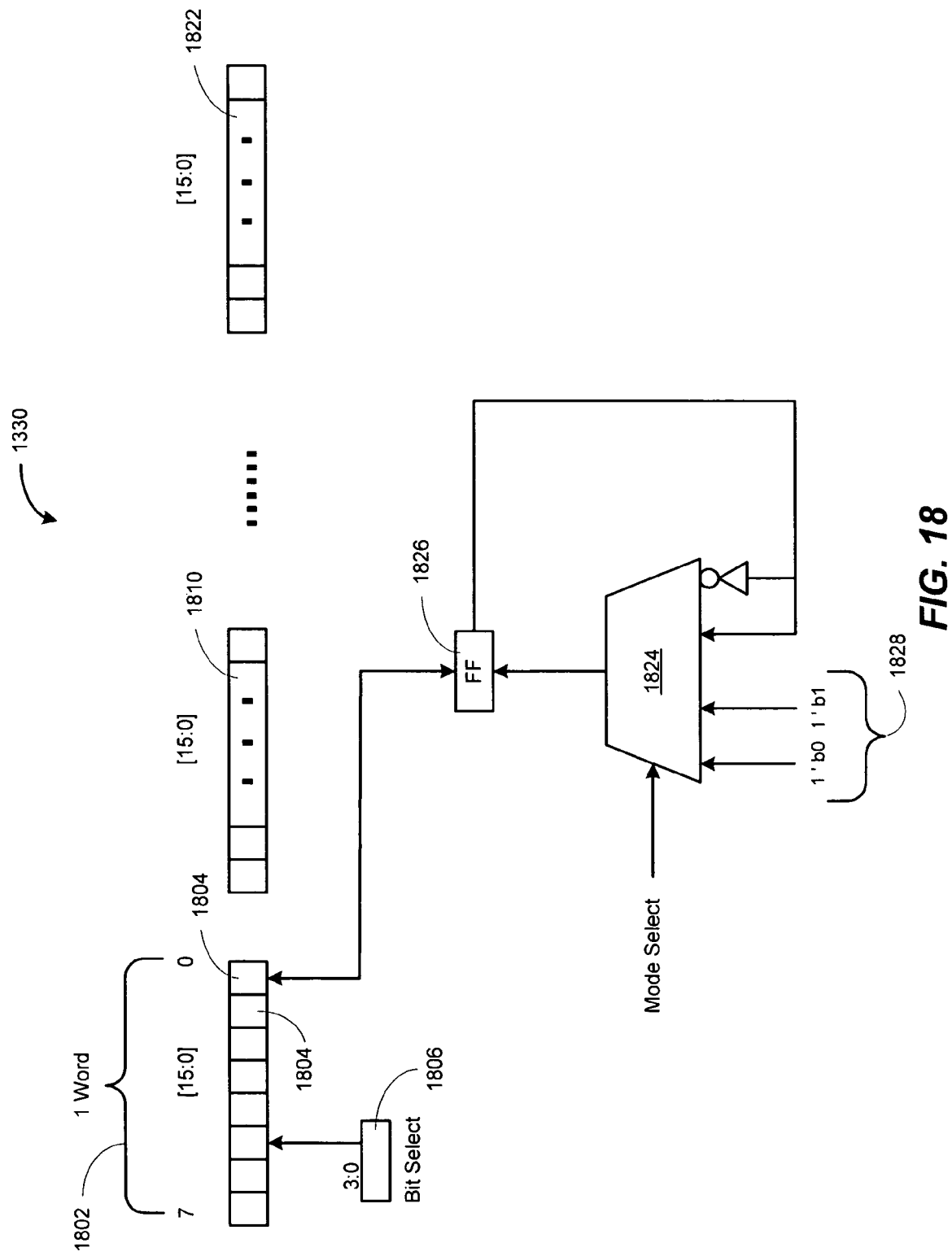
FIG. 18 shows further details of the circuitry included in the block 1330, in high-level block diagram form and accordance with an embodiment of the present invention.

FIG. 18 shows further details of the circuitry included in the block 1330, in high-level block diagram form and accordance with an embodiment of the present invention. In FIG. 18, a one-word register 1802 is shown to include 8 bit positions, each bit position 1804 capable of being modified by a bit select circuit 1806. Such modifications include but are not limited to inserting a '0', inserting a '1', NOTing the bit, which is the equivalent of inverting it or to not modify it at all, which is the equivalent of a "NOP" or no-operation. The one-word register is repeated, i.e. word registers 1810-1820 each store and modify a word, as the register 1802. Thus, in the example of a 16-bit word and 8 words, the modification of eight 16-bit words is performed in one clock cycles, unlike traditional DSPs which need multiple cycles for performing the same. The modification or puncturing/de-puncturing of each bit of the words is controlled by the mux 1824 and the flip-flop 1826 coupled to each other and the register 1802 in the manner shown in FIG. 18. The registers 1810-1822 are also similarly coupled to other mux and flip-flop circuits. A mode select bit selects which of the four inputs of the mux to select and it is generated from the instruction code. Two of the inputs 1828 to the mux 1824 also come from the instruction code, whereas, two other of the mux inputs are from memory, one of which may be an inverted version of the other, as shown in FIG. 18.

The input to the circuits of the block 1330 are generated from the block 1332, which will be discussed shortly but for now, generates either fully interleaves, partially interleaves or un-interleaves N-bit words to the block 1330. In one example the operation is on 256-bit words, in which case, the block 1330 operates on 16-bits at a given time. A prefetched control word is used to decide which bits within the 16-bit word must be inverted. Optionally, a '0' or a '1' value is entered into specific bit positions in addition to inversion.

Figure 19:
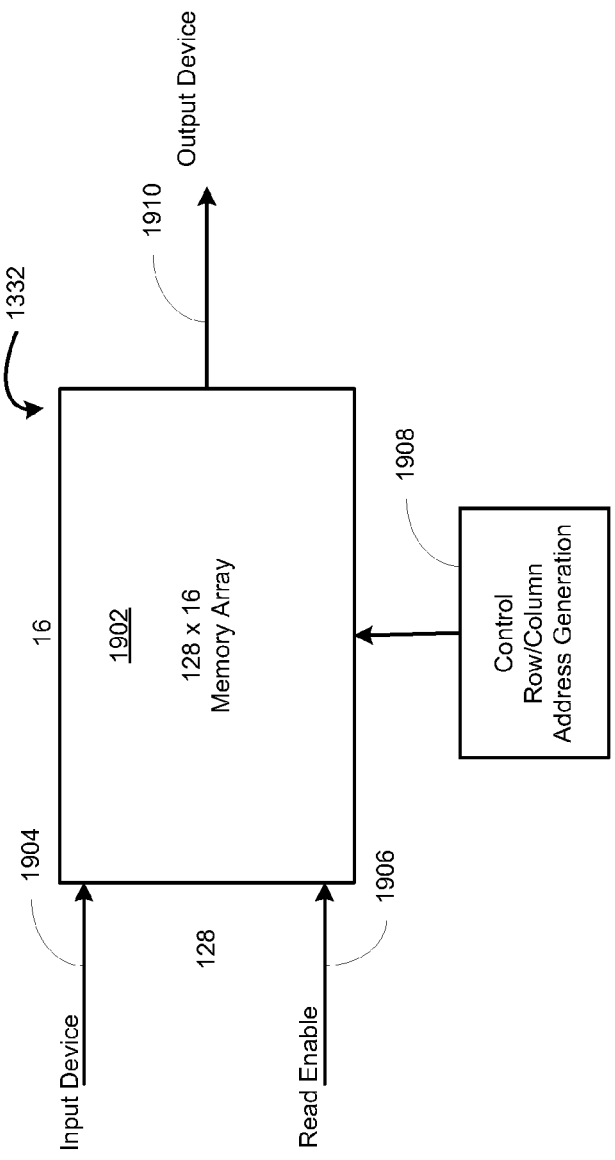
FIG. 19 shows further details of the circuitry included in the block 1332, in high-level block diagram form and accordance with an embodiment of the present invention.

FIG. 19 shows further details of the circuitry included in the block 1332, in high-level block diagram form and accordance with an embodiment of the present invention. In FIG. 19, a memory array 1902 is shown to receive an input 104 from an input device, through the bus 1316, and a read enable input 1906, through the bus 1316 and further receive input from a control row-column address generation block 1908 to generate an output device signal 1910, which is provide to the block 1302. In one example, the block 1902 includes a memory array made of 128×16 bits. Data can be written to or read from the block 1902 either on a row basis or a column basis. That is a row of the memory array of the block 1902 may be read or a column of the memory array of the block 1902 may be read. Additionally, data can be written on a row-basis yet read on a column basis and visa versa.

Figure 20:
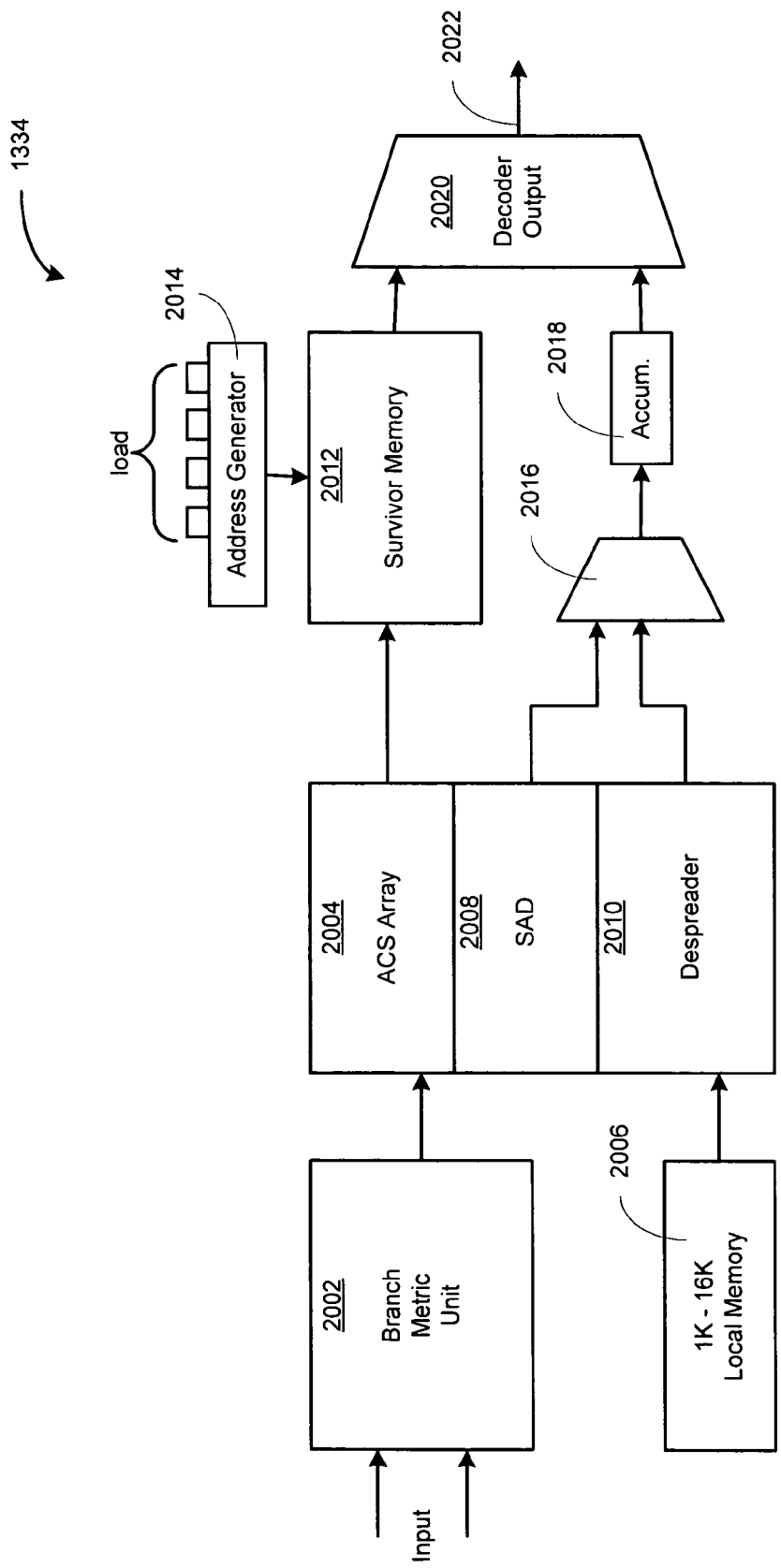
FIG. 20 shows further details of the circuitry included in the block 1334, in high-level block diagram form and accordance with an embodiment of the present invention.
Figure 21I:
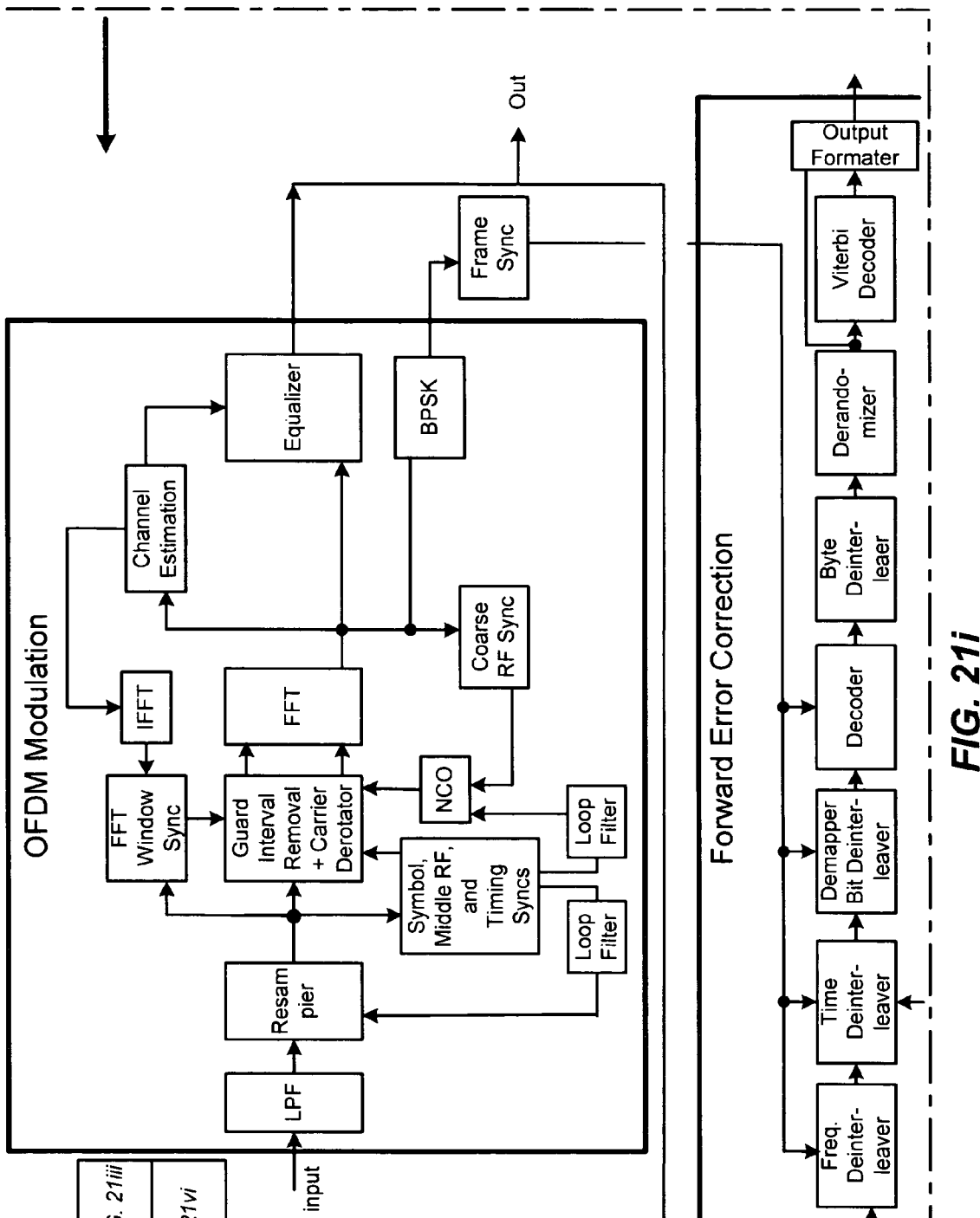
FIG. 21 shows an example of programming flow and tools using the processor 22 in accordance with an embodiment of the present invention.
Figure 21I:
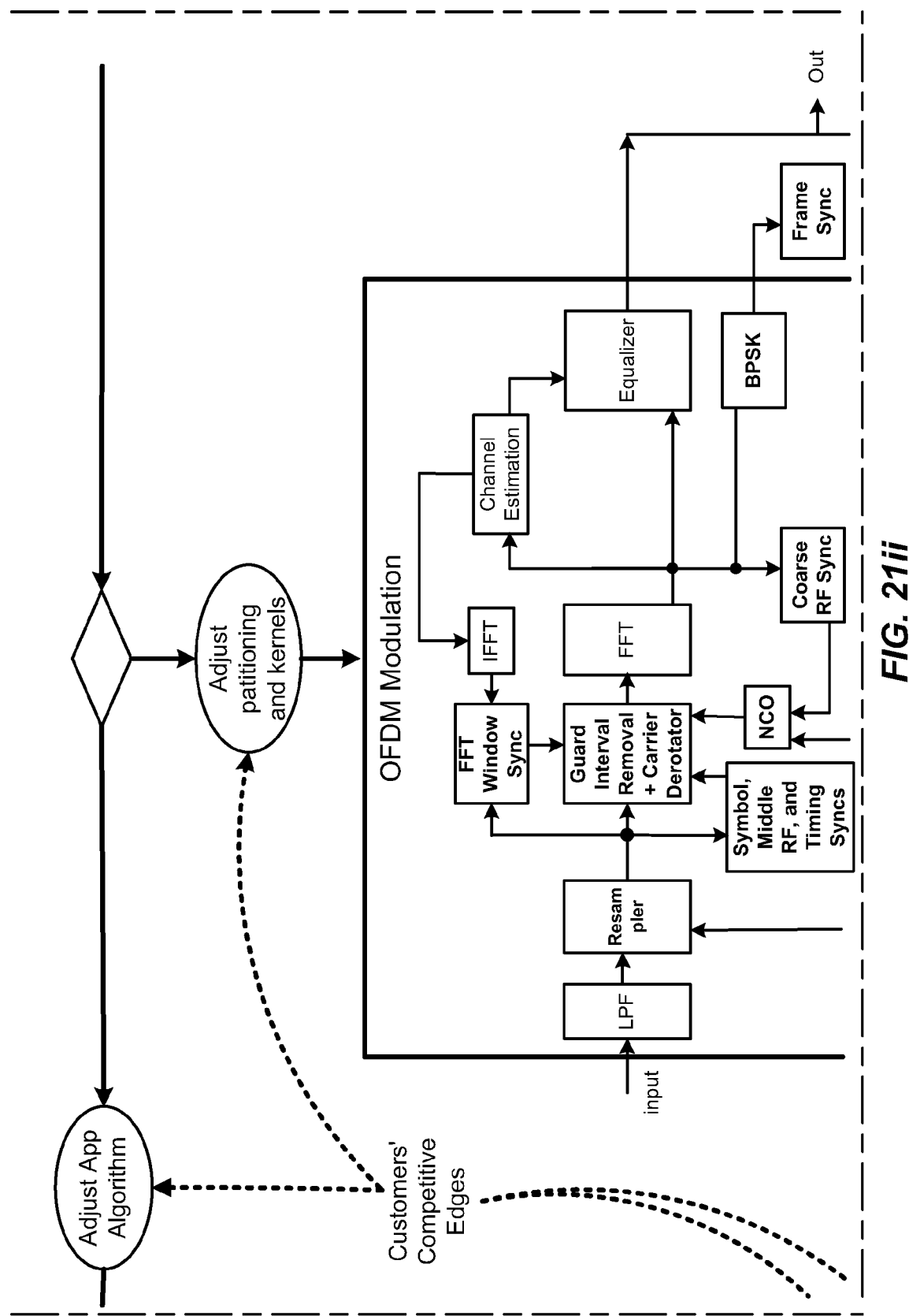
Figure 21I:
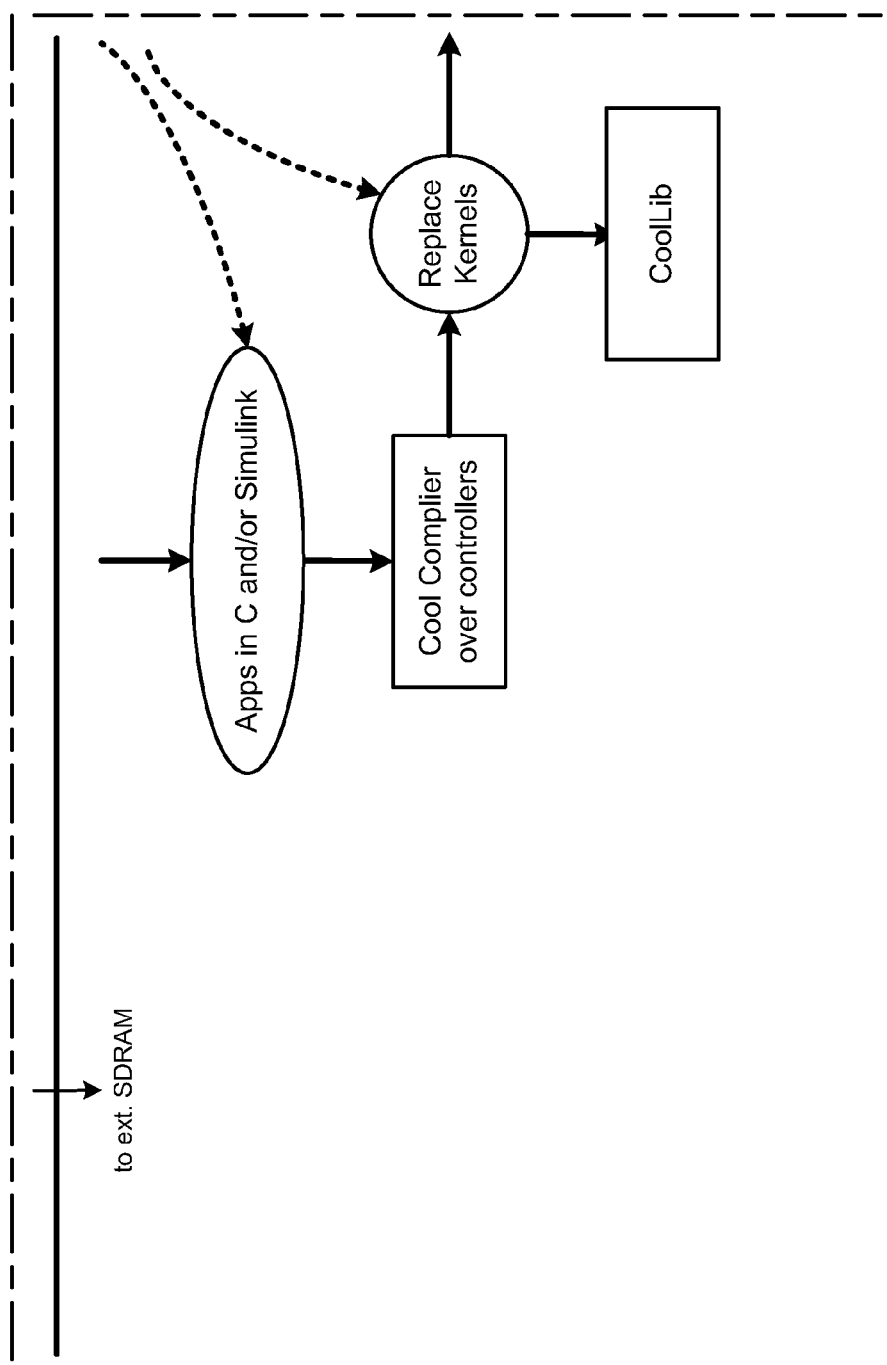
Figure 21V:
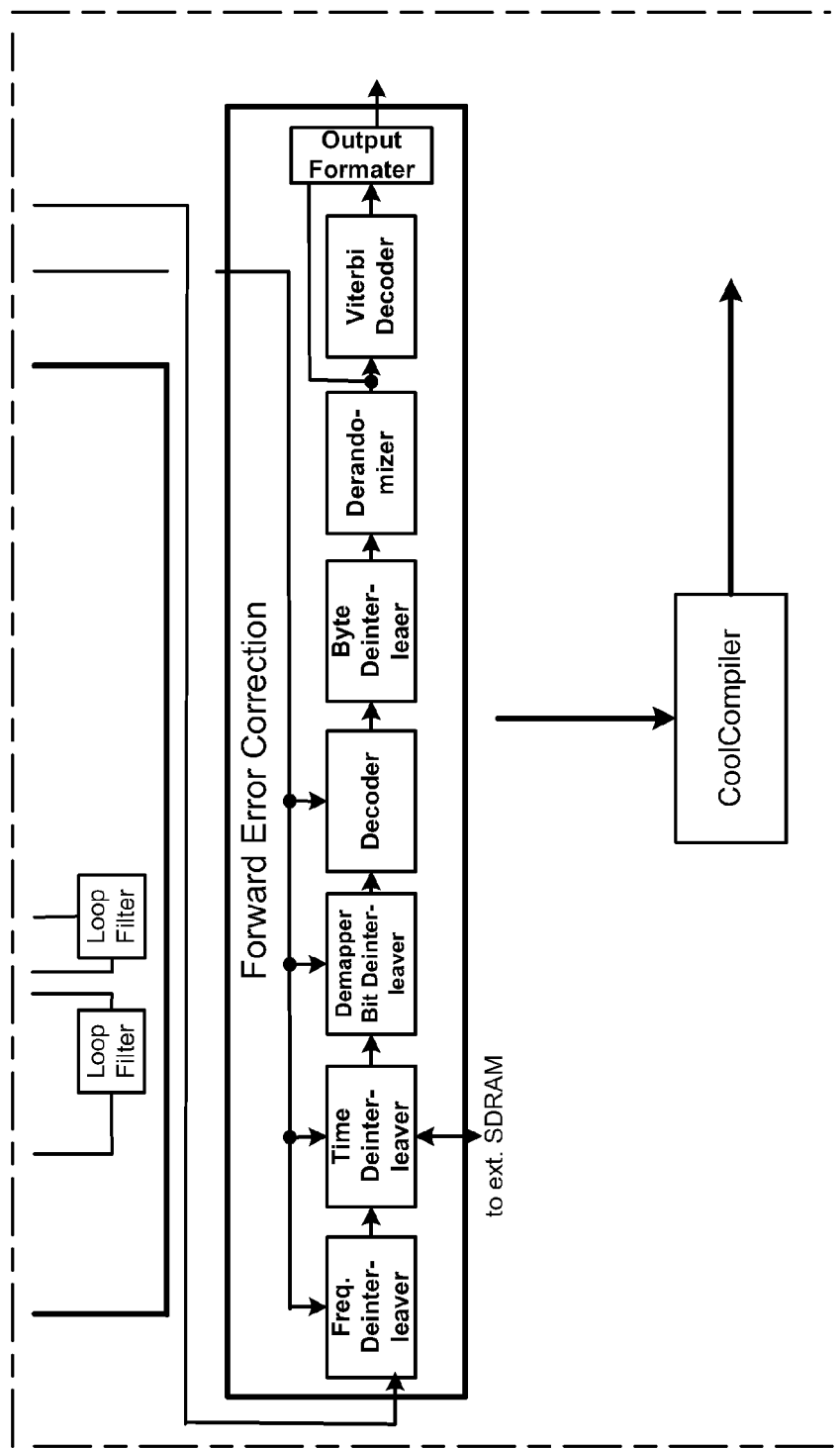
Figure 21V:
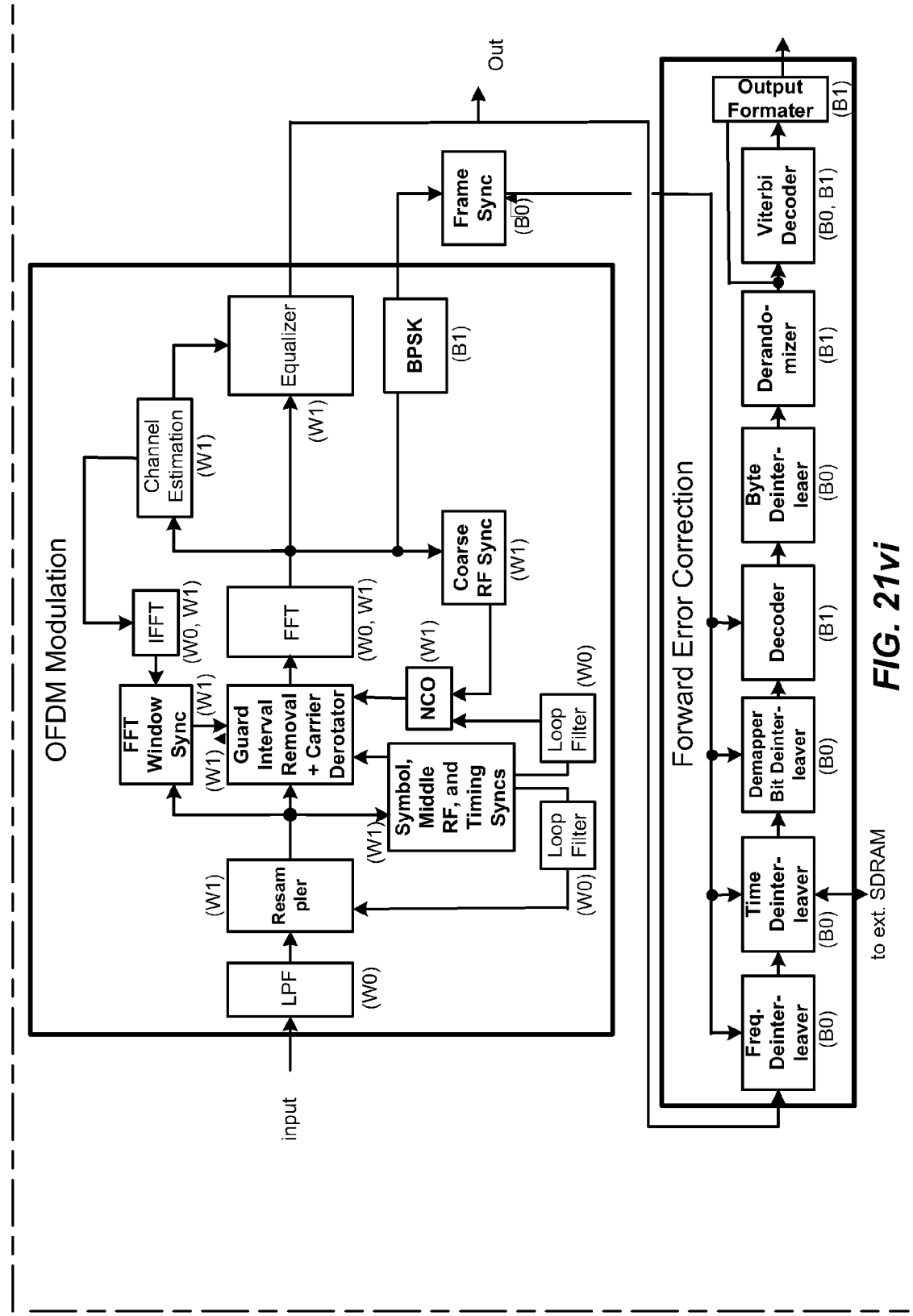

FIG. 20 shows further details of the circuitry included in the block 1334, in high-level block diagram form and accordance with an embodiment of the present invention. In FIG. 20, a branch metric unit 2002 is shown to receive input from the block 1332 and shown coupled to an add/compare/select block, which is shown coupled to a survivor memory block 2012, which is, in turn, shown coupled to a mux 2020, which generates a output 2022 coupled to the bus 1310. The mux 2020 is further shown to receive another input from the output of an accumulator 2018, which receives input from a mux 2016. Optionally, a sum-of-absolute-differences (SAD) block 2008 and a despreader (for de-spreading) block 2010 are used to generate an input to the mux 2016. In the absence of blocks 2008 and 2010, the mux 2016, the block 2018 and the mux 2020 would not be used. A local memory 2006 is shown coupled to the block 2004. The block 2002 performs a branch metric calculation known to those who are familiar with Viterbi coding/decoding. Survivor paths, also known to those who are familiar with Viterbi coding/decoding, are stored in the block 2012.

The block 1334 is capable of executing turbo-decoder, SAD and despreading functions. In one example, 32 to 256 add-compare-select operations can be performed, in parallel, by the block 2004, on 16-bit branch and path metric values generated by the local memory 2006. In one example, the size of the local memory 2006 is 1 kilobits and 16 kilobits.

There may be a plurality of blocks 2004 included in the block 1334 each of which may include 8-bit signed adders. Additionally, each can include a compare and a select block that returns the winning path and the decision bit. The add-compare-select operations result in a winning path and decision bits. The winning path can be shared with neighboring blocks 2004 using a "multi-cast' interconnect scheme from going down the trellis. Decision bits with the winning branch and path metric values are stored for backtracking.

The block 2008 uses four eight-bit ALUs, in one example, four absolute differences of which can be calculated every cycle. A reduction tree is built into the block 2004 to accumulate the absolute differences into a 16-bit accumulator. The multi-cast network can be used to send these values across for further reduction. A total of 128 8-bit (64 16-bit) blocks 2008 are possible per clock cycle. However, it is believed that the effective utilization considering all of the overheads might result in a lower number.

The ALUs implement the same conditional add-subtract function that the special ALU block implements and discussed hereinabove. The control bits needed for despreading must be loaded into the local memory from where it is fetched and stored in a register. The results are accumulated into a 16-bit accumulator from where I can be transferred to other blocks 2004 for reduction operation thereon. With despreading, in one example, it is possible to perform 128 simultaneous conditional add-subtracts in a single cycle. The energy per transition in this unit is higher than that used for the special ALU serving some general functions other than despreading and SAD. For smaller number of fingers or for lower rate motion estimation, the special ALU is a more power efficient option.

Figure 22:
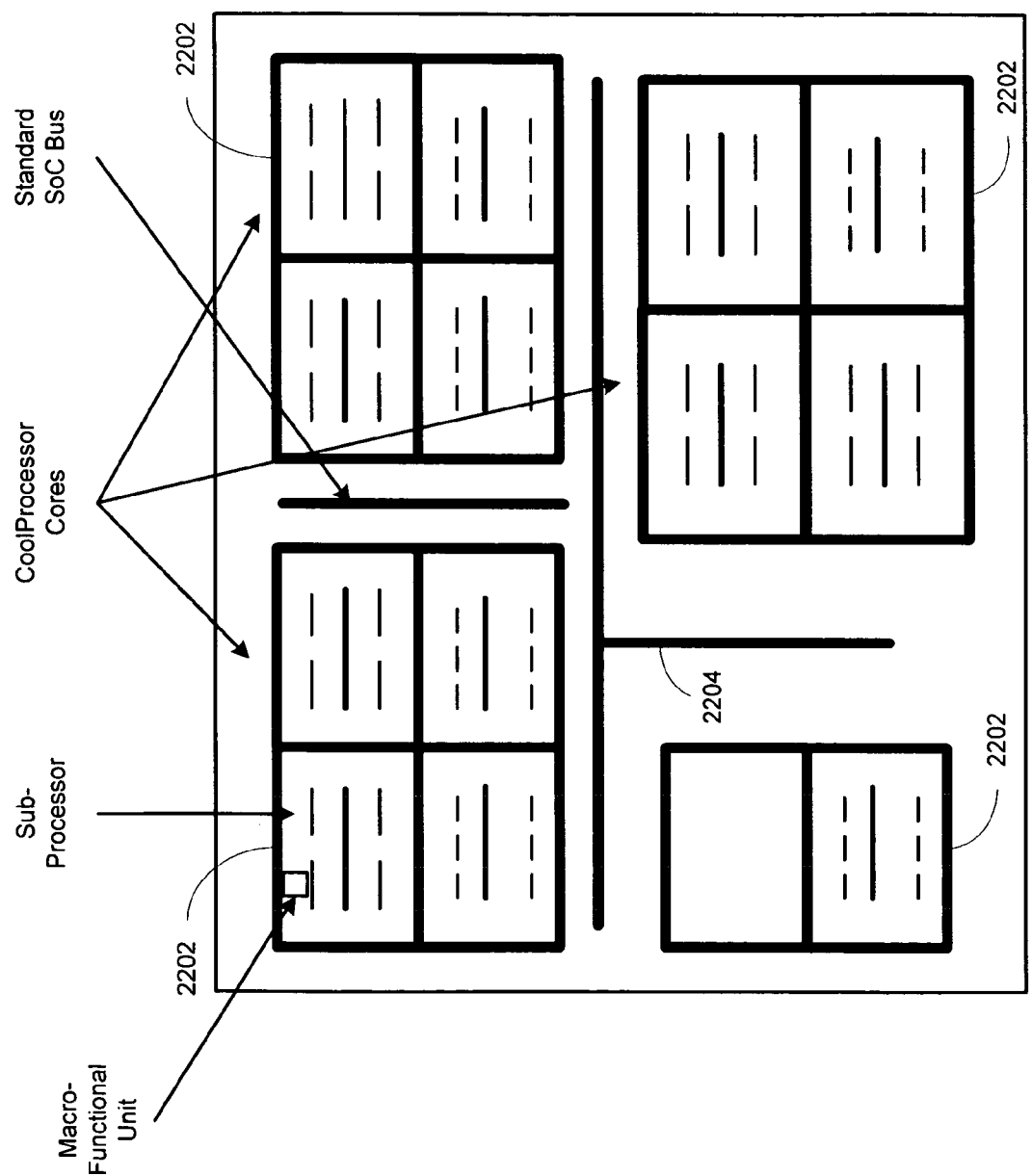
FIG. 22 shows an example of the scalability of embodiments of the present invention.

FIG. 21 shows an example of programming flow and tools using the processor 22 in accordance with an embodiment of the present invention. FIG. 22 shows an example of the scalability of embodiments of the present invention. For example, in FIG. 22, there are clusters 2202 of sub-processors of N-type and W-type shown to be interconnected using the bus 2204. Each cluster 2202 includes two or four sub-processors. The bus 2204, in one example, is a standard SoC bus. By maintaining an hierarchical design methodology, interconnectivity is addressed.

Scaling of the processor 20 results in clusters of four sub-processors with separate buses for each cluster, otherwise, four sub-processors can share a single memory. Scalability with respect to processors has generally been by way of increasing the number of processors or increasing the frequency or speed of the processor. However, complex applications require scaling beyond that which has been previously done. In the present invention, the W type and N type sub-processors are modified so that four such sub-processors forming a processing can process a single application.

Accordingly, the processor 22 is equipped with capability to run control and sequential DSP code found in targeted applications more efficiently than RISC and Super Scalar processors directly based on compilation from C code. At the same time, it is designed to take advantage of automatic code generation techniques used in RISC and Super Scalar processors for legacy and light applications. Furthermore, the processor 22 works with matured and industry standard software tools like Simulink for application mapping and development. Moore's Law can be utilized to enhance performance of the processor 22. The processor 22 is not only a highly parallel machine but also a heterogeneous multi-processor. It is a proven fact in both industry and academia that parallel heterogeneous multi-processors are required to address demanding multimedia and communications applications. It allows utilization of many of the automatic code generation techniques used in VLIW without using any power and area inefficient techniques. It is optimized to take advantage of repeating patterns based on compilation of control code from C. This significantly reduces control power and makes it possible to run compiled serial code efficiently. Additionally, the processor 22's programming model is designed to suit a large community of DSP programmers using tools familiar to them like Simulink. Its development flow provides the means for efficient C-compilation of the control and sequential DSP code. Also an extensive set of library of highly efficient communications and multimedia kernels are provided. Examples are parameterized library of FFT, IDCT, RRC, Viterbi, VLC, 2D/3D Graphics, Turbo codec, and De-scrambler.

The data path design in the processor 22 successfully integrates varying interconnect structures connecting functional units of varying granularity to effectively address a focused yet highly lucrative application mix.

The scalability of the processor 22 is designed to fit all applications in a single block (time multiplexed) with nearest neighbor connections within a block based on standard SoC bus. Considerable amount of inefficiency and all the system level non-determinism is reduced because multiple blocks can be used to process multiple applications without any proprietary communication between them.

Figure 23I:
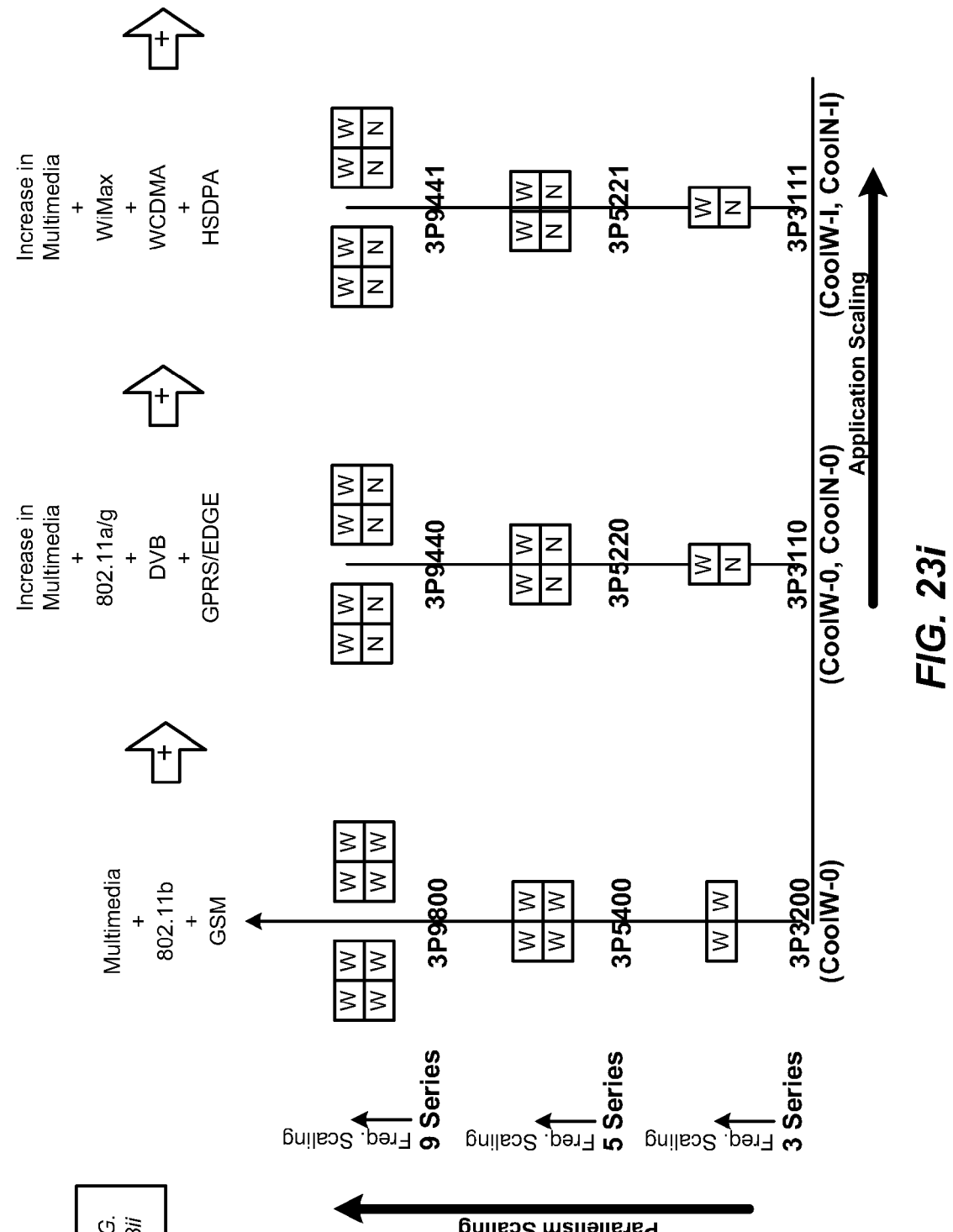
FIG. 23 shows the a chart presenting some of the benefit the scalability of the present invention.
Figure 23I:
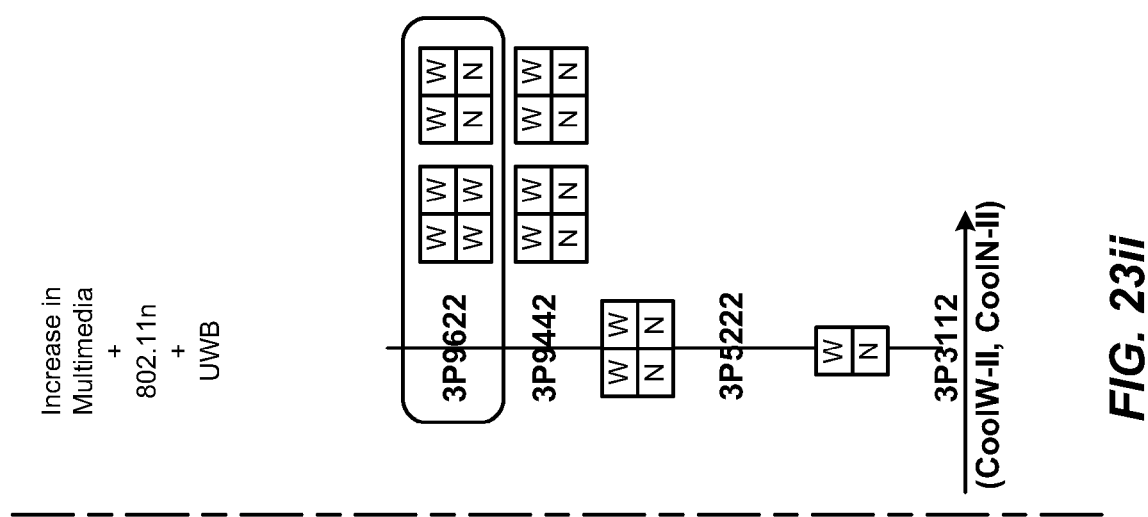

FIG. 23 shows a chart presenting some of the benefit the scalability of the present invention.

The devices and subsystems of the exemplary embodiments of FIGS. 1-23 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, etc. Non-volatile media can include, for example, optical or magnetic disks, magneto-optical disks, and the like. Volatile media can include dynamic memories, and the like. Transmission media can include coaxial cables, copper wire, fiber optics, and the like. Common forms of computer-readable media can include, for example, a floppy disk, a flexible disk, hard disk, magnetic tape, any other suitable magnetic medium, a CD-ROM, CDRW, DVD, any other suitable optical medium, a RAM, a PROM, an EPROM, a FLASH-EPROM, an SD card, a microSD card, a USB stick, any other suitable memory chip or cartridge, or any other suitable medium from which a computer can read.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A heterogeneous, scalable processor, said processor comprising:
   a first heterogeneous programmable integrated circuit sub-processor configured for 16, 24, 32 and 64-bit processing; and
   a second heterogeneous programmable integrated circuit sub-processor configured for 8, 4 and 1-bit processing,
   wherein at least one of the first and second sub-processors includes one or more macro-functional units (MFUs) corresponding to a programmable subset of one or more commonly occurring operations of target applications,
   wherein each of the MFUs include a local memory therein for local computation, and are configured for rearrangement of data values to and from the local memory, and
   wherein each of the first and second sub-processors can only execute one function or stream of data at a time, and include a built in control block dedicated to controlling and synchronizing an order of function execution.

2. The processor of claim 1, further including a plurality of the first and second sub-processors.

3. The processor of claim 1, wherein at least one of the first and second sub-processors executes programs for multimedia applications.

4. The processor of claim 1, wherein each of the first and second sub-processors includes a plurality of MFUs.

5. The processor of claim 4, wherein the plurality of MFUs include a load/store block for generating memory addresses for use by another of the plurality of the MFUs.

6. The processor of claim 5, wherein the plurality of MFUs include a scalar arithmetic logic unit (ALU) and a multiply accumulate block coupled to the load/store block for performing scalar arithmetic and logic and multiply operations on data received from the load/store block.

7. The processor of claim 6, wherein the plurality of MFUs include a vector block coupled to the load/store block and the scalar ALU and multiply accumulate block for performing vector operations on data from the load/store block, the vector block generating vector data, said vector block used to generate vector store masks for vector stores to the local memory.

8. The processor of claim 7, wherein the plurality of MFUs include a vector ALU and a multiply accumulate block coupled to the scalar ALU and multiply accumulate block and the vector block for performing vector ALU and multiply accumulate operations on vector data.

9. The processor of claim 1, wherein at least one of the first and second sub-processors includes a store unit block, and a plurality of macro function blocks and a load unit block, the macro function blocks coupled to a load unit block and further coupled to a macro function bus for coupling the macro function blocks to the store unit block.

10. The processor of claim 9, wherein at least one of the first and second sub-processors includes a data path unit (DPU) block, a controller, sequencer, and data address generator (DAG) block.

11. The processor of claim 9, wherein the plurality of macro function blocks include a Galois field multiply accumulate (MAC) block, coupled to the macro function bus and the load unit block for performing Galois field operations.

12. The processor of claim 11, wherein the plurality of macro function blocks include an arithmetic logic unit (ALU), coupled to the load unit block, for performing ALU operations.

13. The processor of claim 12, wherein the plurality of macro function blocks include a puncturing/depuncturing block coupled to the load unit block for performing puncturing/depuncturing operations.

14. The processor of claim 13, wherein the plurality of macro function blocks include an interleaver block coupled to the load unit block and the load unit block for performing interleaving operations.

15. The processor of claim 14, wherein the plurality of macro function blocks include a viterbi block coupled to the store unit block and the interleaver block for performing viterbi operations.

16. The processor of claim 15, wherein the plurality of macro function blocks include a combiner block coupled to the load unit block for performing combining operations.

17. The processor of claim 15, wherein at least one of the first and second sub-processors includes a device coupled between the store unit block and the load unit block for receiving data from the local memory.

18. The processor of claim 15, including a shared register coupled between the first and second sub-processors for direct communication between the first and second sub-processors.

19. A method for operating a heterogeneous, scalable processor, said method comprising:
   performing 16, 24, 32 and 64-bit processing by a first heterogeneous programmable integrated circuit sub-processor;
   performing 8, 4 and 1-bit processing by a second heterogeneous programmable integrated circuit sub-processor;
   providing in at least one of the first and second sub-processors, one or more macro-functional units (MFUs) corresponding to a programmable subset of one or more commonly occurring operations of target applications;
   including in each of the MFUs a local memory for local computation for rearranging of data values to and from the local memory;
   executing only one function or stream of data at a time with each of the first and second sub-processors; and
   controlling and synchronizing an order of function execution in each of the first and second sub-processors with a built in, dedicated control block.

20. The method of claim 19, further comprising providing a plurality of the first and second sub-processors.

21. The method of claim 19, further comprising executing programs for multimedia applications by at least one of the first and second sub-processors.

22. The method of claim 19, further comprising providing in each of the first and second sub-processors a plurality of MFUs.

23. The method of claim 22, further comprising providing in the plurality of MFUs a load/store block for generating memory addresses for use by another of the plurality of the MFUs.

24. The method of claim 23, further comprising providing in the plurality of MFUs a scalar arithmetic logic unit (ALU) and a multiply accumulate block coupled to the load/store block for performing scalar arithmetic and logic and multiply operations on data received from the load/store block.

25. The method of claim 24, further comprising providing in the plurality of MFUs a vector block coupled to the load/store block and the scalar ALU and multiply accumulate block for performing vector operations on data from the load/store block, the vector block generating vector data, said vector block used to generate vector store masks for vector stores to the local memory.

26. The method of claim 25, further comprising providing in the plurality of MFUs a vector ALU and a multiply accumulate block coupled to the scalar ALU and multiply accumulate block and the vector block for performing vector ALU and multiply accumulate operations on vector data.

27. The method of claim 19, wherein at least one of the first and second sub-processors includes a store unit block, and a plurality of macro function blocks and a load unit block, the macro function blocks coupled to a load unit block and further coupled to a macro function bus for coupling the macro function blocks to the store unit block.

28. The method of claim 27, wherein at least one of the first and second sub-processors includes a data path unit (DPU) block, a controller, sequencer, and data address generator (DAG) block.

29. The method of claim 27, further comprising performing Galois field operations by the plurality of macro function blocks with a Galois field multiply accumulate (MAC) block, coupled to the macro function bus and the load unit block.

30. The method of claim 29, further comprising performing ALU operations by the plurality of macro function blocks with an arithmetic logic unit (ALU), coupled to the load unit block.

31. The method of claim 30, further comprising performing puncturing/depuncturing operations by the plurality of macro function blocks with a puncturing/depuncturing block coupled to the load unit block.

32. The method of claim 31, further comprising performing interleaving operations by the plurality of macro function blocks with an interleaver block coupled to the load unit block and the load unit block.

33. The method of claim 32, further comprising performing viterbi operations by the plurality of macro function blocks with a viterbi block coupled to the store unit block and the interleaver block.

34. The method of claim 33, further comprising performing combining operations by the plurality of macro function blocks with a combiner block coupled to the load unit block.

35. The method of claim 33, further comprising receiving data from the local memory by at least one of the first and second sub-processors with a device coupled between the store unit block and the load unit block.

36. The method of claim 33, further comprising providing a shared register coupled between the first and second sub-processors for direct communication between the first and second sub-processors.

* * * * *